(12) United States Patent
Hosoyama et al.

(10) Patent No.: US 11,835,426 B2
(45) Date of Patent: Dec. 5, 2023

(54) VIBRATION CONTROL SYSTEM USING KURTOSIS RESPONSE SPECTRUM

(71) Applicants: Osaka Research Institute of Industrial Science and Technology, Osaka (JP); IMV CORPORATION, Osaka (JP)

(72) Inventors: Akira Hosoyama, Osaka (JP); Yuji Nakaura, Osaka (JP); Yoshikado Yamauchi, Osaka (JP)

(73) Assignees: Osaka Research Institute of Industrial Science and Technology, Osaka (JP); IMV CORPORATION, Osaka (JP)

( * ) Notice: Subject to any disclaimer, the term of this patent is extended or adjusted under 35 U.S.C. 154(b) by 26 days.

(21) Appl. No.: 17/705,575

(22) Filed: Mar. 28, 2022

(65) Prior Publication Data
US 2022/0373427 A1 Nov. 24, 2022

(30) Foreign Application Priority Data
May 18, 2021 (JP) ................................ 2021-083585

(51) Int. Cl.
*G01M 7/02* (2006.01)
*B06B 1/02* (2006.01)

(52) U.S. Cl.
CPC ........... *G01M 7/022* (2013.01); *B06B 1/0261* (2013.01); *G01M 7/025* (2013.01)

(58) Field of Classification Search
CPC ........ B06B 1/0261; G01H 1/00; G01H 17/00; G01M 5/0066; G01M 7/02; G01M 7/022;
(Continued)

(56) References Cited

U.S. PATENT DOCUMENTS 5,012,428 A * 4/1991 Ueno .................... G01M 7/022
  700/280
5,614,060 A   3/1997 Hanawa
(Continued)

FOREIGN PATENT DOCUMENTS

JP    H0634481 A  *  2/1994
JP    H0868718 A  *  3/1996
(Continued)

OTHER PUBLICATIONS

Hosoyama, Akira et al. "Development and Validation of Kurtosis Response Spectrum Analysis for Antivibration Packaging Design Taking into Consideration Kurtosis" Packaging Technology and Science; 2020; 33: 51-64: Accepted: Oct. 2, 2019.

*Primary Examiner* — David L Singer
(74) *Attorney, Agent, or Firm* — Jason H. Vick; Sheridan Ross, PC

(57) ABSTRACT

A vibration control system calculates a Kurtosis Response Spectrum (KRS) of a response waveform which characterizes non-Gaussianity in a random vibration test and is utilized for vibration control. The system compares a target KRS and the response KRS, and controls a characteristic of a phase used to generate a waveform for control such that the response KRS becomes equal to the target KRS. The waveform for control is generated by applying a random phase to each frequency component of an amplitude corresponding to Power Spectral Density (PSD). The system controls a characteristic of this phase (e.g., standard deviation) per frequency, controls the KRS, deforms the waveform for control on the basis of an equalization characteristic, and calculates a drive waveform. The system sequentially updates the equalization characteristic on the basis of the response waveform and the drive waveform. The calculated drive waveform is provided to a vibration generator.

12 Claims, 23 Drawing Sheets

(58) Field of Classification Search
CPC .................. G01M 7/025; G01M 7/06; G05B 2219/49281; G05D 19/02
See application file for complete search history.

(56) References Cited

U.S. PATENT DOCUMENTS

| | | | |
|---|---|---|---|
| 2007/0185620 A1* | 8/2007 | Van Baren | G01M 7/022 700/280 |
| 2010/0305886 A1* | 12/2010 | Zhuge | G05B 19/19 702/56 |
| 2013/0231878 A1* | 9/2013 | Snyder | G01M 7/022 702/56 |
| 2014/0129030 A1* | 5/2014 | Zhuge | G05D 19/02 700/275 |

FOREIGN PATENT DOCUMENTS

| | | | |
|---|---|---|---|
| JP | H08-339989 A | | 12/1996 |
| JP | 2010204007 A | * | 9/2010 |
| JP | 2013096845 A | * | 5/2013 |
| JP | 5421971 B2 | | 2/2014 |
| JP | 2018004504 A | * | 1/2018 |
| JP | 2018021781 A | * | 2/2018 |

\* cited by examiner

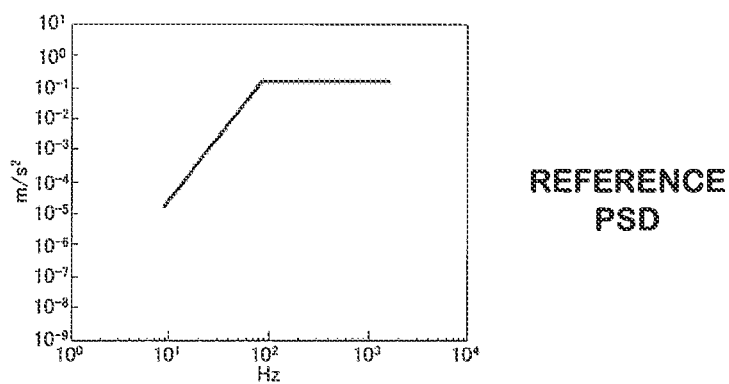
FIG.5A    REFERENCE PSD
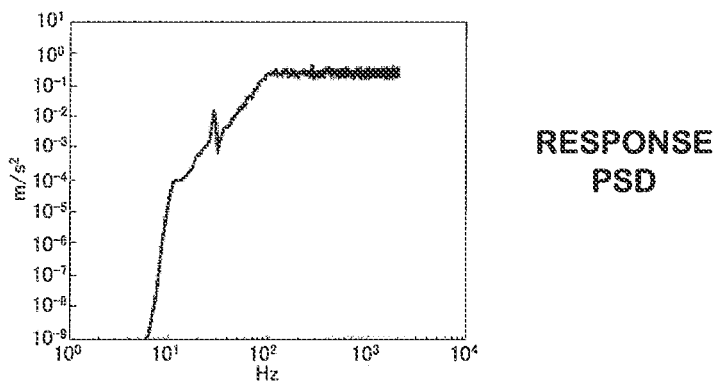
FIG.5B    RESPONSE PSD
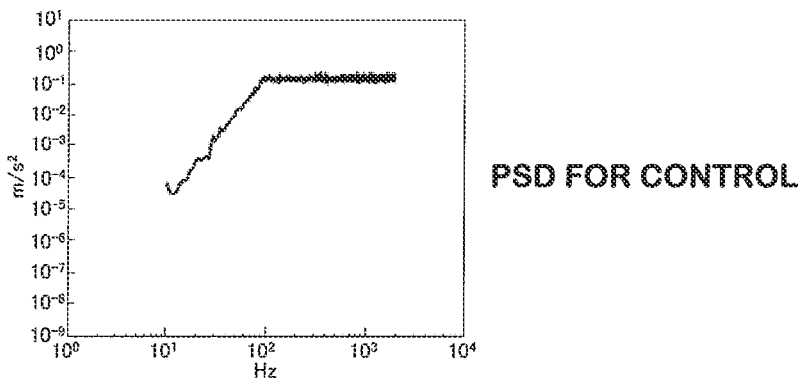
FIG.5C    PSD FOR CONTROL
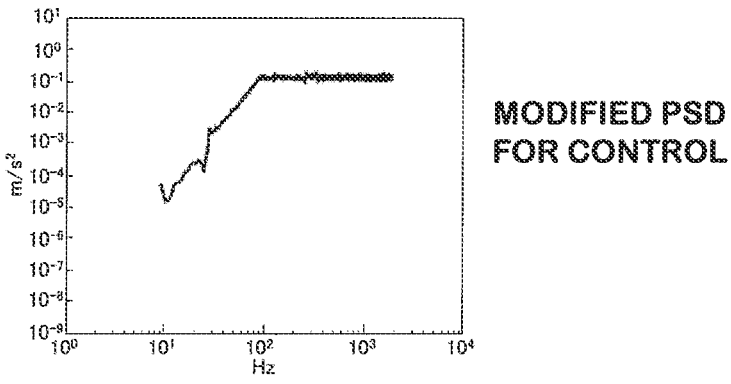
FIG.5D    MODIFIED PSD FOR CONTROL

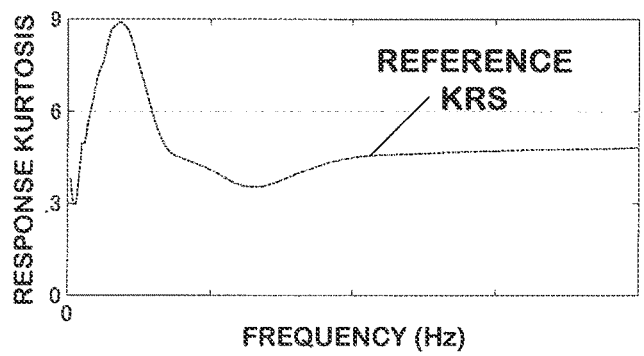
FIG.6A
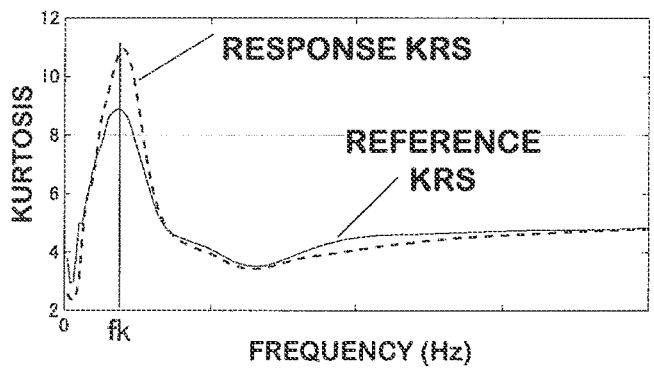
FIG.6B
FIG.6C
| Time | t-100 | t-99 | · · · | t-1 | t0 | t1 | · · · | t99 |
|---|---|---|---|---|---|---|---|---|
| Phase of f k | 181 | -36 | · · · | 110 | 47 | | · · · | |

| FREQUENCY | f1 | f2 | · · · | f50 |
|---|---|---|---|---|
| PHASE | 181 | -36 | · · · | 110 |

FIG.23
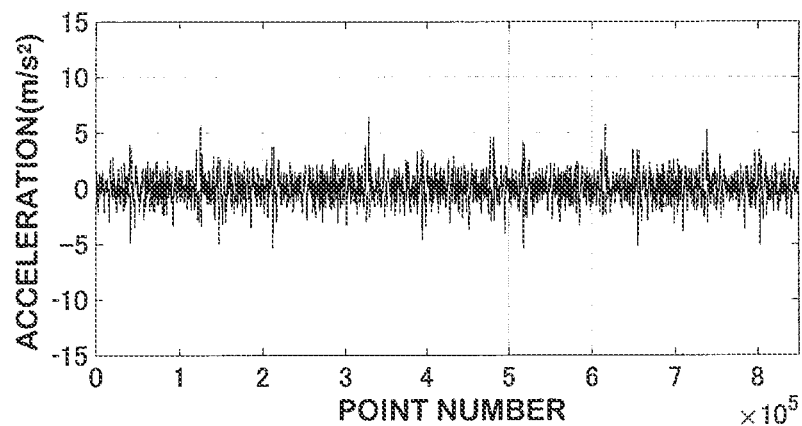
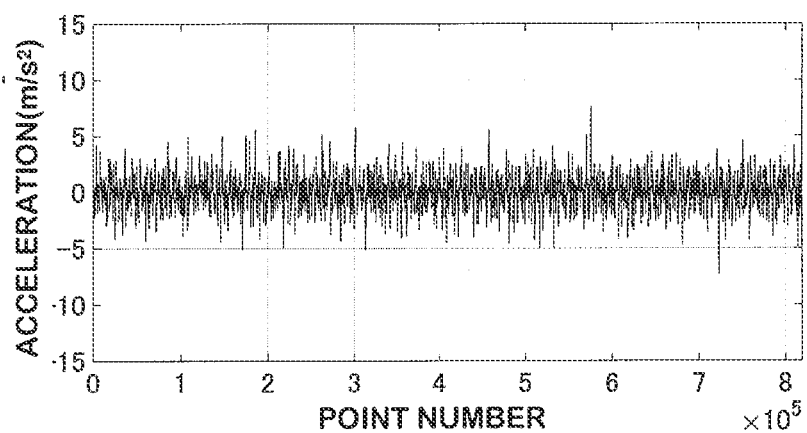
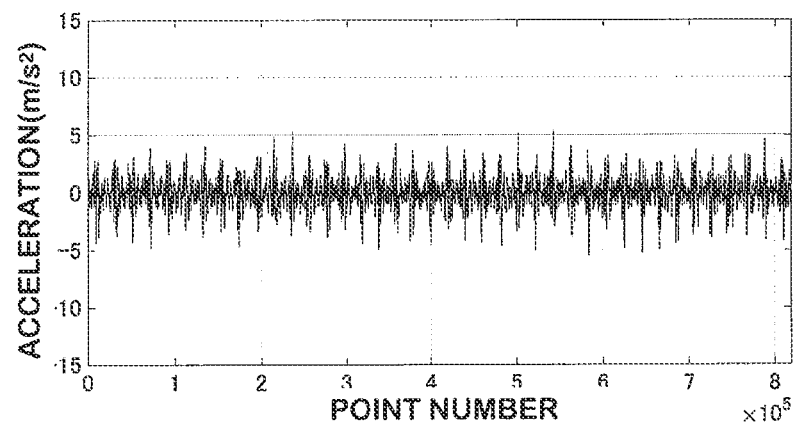

VIBRATION CONTROL SYSTEM USING KURTOSIS RESPONSE SPECTRUM

CROSS-REFERENCE TO RELATED APPLICATIONS

This application claims the benefit under 35 U.S.C. 119(a) to Japanese Patent Application No. JP 2021-083585, filed May 18, 2021, the entire disclosure of which is incorporated herein by reference in its entirety.

BACKGROUND

1. Field

The present invention relates to a vibration test system capable of vibrating a test piece by vibration with a reference non-Gaussian characteristic.

2. Description of the Related Art

In order to simulate stress of vibration to which a test piece is subjected during transportation and operation, a vibration test is conducted by applying desired vibration to the test piece. In the vibration test, a vibration control system controls a vibration generator to generate the desired vibration.

In the case where the vibration applied in reality is recorded and such vibration can be applied to the test piece, it is possible to conduct the accurate vibration test. However, in order to record and reproduce an actual vibration waveform itself, enormous recording capacity is required. Thus, such a vibration test is not commonly conducted.

Meanwhile, a test is also conducted by applying vibration with sinusoidal waves. In this case, the vibration can easily be controlled since only the sinusoidal waves are output. However, there is a problem that the vibration applied in the test is excessively deviated from the vibration applied in reality.

To handle such a problem, a random vibration test is conducted. In the random vibration test, a frequency characteristic (power spectral density (PSD)) of the vibration applied in reality is calculated, and vibration with the desired power spectral density is applied to the test piece.

FIG. 20 illustrates a vibration control system for the conventional random vibration test disclosed in Japanese Laid-open Patent Application HEI8(1996)-68718. A test piece 4 that is fixed to a vibration generator 2 is vibrated by the vibration generator 2. The vibration generator 2 itself has a frequency characteristic. Thus, even when the vibration generator 2 applies the vibration with a target spectrum to the test piece 4, the test piece 4 is not vibrated as it is expected. Thus, feed-forward control is executed such that the vibration control system equalizes PSD of a vibration waveform of the test piece 4 to reference PSD as a target.

The vibration of the test piece 4 is detected by an acceleration sensor 6 and is converted into a response waveform as a digital signal by an A/D convertor 10. Response PSD calculation means 12 executes a fast Fourier transform on the response waveform to calculate response PSD.

Means 14 for calculating PSD for control compares the reference PSD and the response PSD, and calculates PSD for control such that the reference PSD and the response PSD become equal to each other. Drive waveform calculation means 16 executes an inverse fast Fourier transform by applying a random phase to each frequency component of an amplitude corresponding to the PSD for control, and thereby generates a drive waveform.

A D/A convertor 18 converts the generated drive waveform into an analog signal and applies the analog signal to the vibration generator 2 via an amplifier 28.

As it has been described so far, it is possible to execute the control to apply the vibration with the reference PSD to the test piece 4.

In the system illustrated in FIG. 20, probability density distribution of the vibration applied to the test piece 4 follows Gaussian distribution (normal distribution), as indicated by a solid line in FIG. 21A. In the actual vibration, the probability density distribution thereof often follows non-Gaussian distribution (for example, indicated by a broken line in FIG. 21A). Both of waveforms illustrated in FIG. 21B and FIG. 21C have the same PSD. However, in FIG. 21B, the probability density distribution of the vibration is Gaussian while the probability density distribution of the vibration in FIG. 21C is non-Gaussian. It is understood that, even with the same PSD, the waveforms significantly differ from each other.

In view of the above, as disclosed in Japanese Patent 5421971, the present inventors have developed a vibration control system capable of applying the non-Gaussian vibration to the test piece 4. The vibration control system disclosed in Japanese Patent 5421971 is illustrated in FIG. 22. In this system, when the drive waveform is calculated on the basis of the PSD for control, an initial value and a standard deviation of the phase applied to each of the frequency components are controlled, so as to obtain the non-Gaussian drive waveform.

In the system illustrated in FIG. 22, kurtosis K and skewness S are used as elements that characterize the non-Gaussian characteristic. Means 22 for calculating non-Gaussian characteristics is designed to calculate the kurtosis K and the skewness S as the non-Gaussian characteristics of the response waveform on the basis of the response waveform. Here, the kurtosis K is an index representing sharpness of the probability density distribution. The skewness S is an index representing an asymmetric property of the distribution.

Means 24 for controlling non-Gaussian characteristics compares a response non-Gaussian characteristic (the kurtosis K and the skewness S described above) and a reference non-Gaussian characteristic as a target, and controls processing by the drive waveform calculation means 16 such that the response non-Gaussian characteristic matches the reference non-Gaussian characteristic. More specifically, when calculating the drive waveform, the means 24 for controlling non-Gaussian characteristics controls the initial value, the standard deviation, and the like of the phase applied to each of the frequency components of the amplitude corresponding to the PSD for control.

As it has been described so far, it is possible to apply the vibration with the desired non-Gaussian characteristic to the test piece 4.

The system as described above, in particular, the system disclosed in Japanese Patent 5421971 can apply, to the test piece 4, the non-Gaussian vibration that satisfies the target kurtosis K. However, even when the kurtosis K is the same, the waveforms are not always the same.

FIG. 23 illustrates three waveforms with the same PSD and the same kurtosis K. However, it is clearly understood that these waveforms differ from each other. Thus, even in the case where the random vibration tests are conducted by specifying the PSD and the kurtosis K, the tests cannot be identical.

The present invention has been made to solve the problem as described above and therefore has a purpose of realizing a parameter that appropriately characterizes non-Gaussianity in a random vibration test and vibration control using the parameter.

SUMMARY

Some of independently applicable features of the present invention will be listed below.

(1)(2) A vibration control system according to the present invention includes: response PSD calculation means that executes a Fourier transform on a response waveform from a vibration sensor to calculate response PSD, the vibration sensor measuring vibration of a test piece vibrated by a vibration generator operating on the basis of a drive waveform; means for calculating PSD for control that compares the response PSD and reference PSD and calculates PSD for control such that the response PSD becomes equal to the reference PSD; drive waveform calculation means that executes an inverse Fourier transform by applying a phase to each frequency component on the basis of the PSD for control and outputs the drive waveform; response KRS calculation means that calculates a kurtosis response spectrum (hereinafter KRS) for the response waveform and sets the KRS as a response KRS, the KRS indicating transferability of kurtosis at each frequency; and phase control means having KRS control means that compares the response KRS and a reference KRS and controls a characteristic of the phase provided to the drive waveform calculation means for each of the frequencies such that the response KRS becomes equal to the reference KRS.

Therefore, a non-Gaussian vibration test can appropriately be conducted by using the kurtosis response spectrum, which indicates a frequency characteristic of the transferability of the kurtosis.

(3)(4) A vibration control system according to the present invention includes: response PSD calculation means that executes a Fourier transform on a response waveform from a vibration sensor to calculate response PSD, the vibration sensor measuring vibration of a test piece vibrated by a vibration generator operating on the basis of a drive waveform; means for calculating PSD for control that compares the response PSD and reference PSD and calculates PSD for control such that the response PSD becomes equal to the reference PSD; drive waveform calculation means that executes an inverse Fourier transform by applying a phase to each frequency component on the basis of the PSD for control and outputs the drive waveform; kurtosis calculation means that calculates kurtosis of the response waveform as response kurtosis; response KRS calculation means that calculates a kurtosis response spectrum (hereinafter KRS) for the response waveform and sets the KRS as response KRS, the KRS indicating transferability of the kurtosis at each frequency; and phase control means having kurtosis control means and KRS control means, the kurtosis control means comparing the response kurtosis and reference kurtosis and controlling a characteristic of the phase provided to the drive waveform calculation means such that the response kurtosis becomes equal to the reference kurtosis, and the KRS control means comparing the response KRS and a reference KRS and controlling the characteristic of the phase provided to the drive waveform calculation means for each of the frequencies such that the response KRS becomes equal to the reference KRS.

Therefore, the non-Gaussian vibration test can appropriately be conducted by using the kurtosis response spectrum, which indicates the transferability of the kurtosis, while realizing the reference kurtosis.

(5) In the vibration control system according to the present invention, the phase control means selects, for each frequency band, whether to control the phase characteristic by the KRS control means or to control the phase characteristic by the kurtosis control means.

Therefore, the kurtosis and the KRS can appropriately and simultaneously be controlled.

(6) In the vibration control system according to the present invention, the phase control means controls the phase characteristic by the KRS control means in the frequency band in which deviation of the response KRS from the reference KRS is equal to or larger than a predetermined value.

Therefore, the kurtosis can be controlled while the KRS is appropriately controlled.

(7) In the vibration control system according to the present invention, based on a setting content, which is set in advance, the phase control means determines, in which frequency band, whether to control the phase characteristic by the KRS control means or to control the phase characteristic by the kurtosis control means.

Therefore, a user can set in advance which control is to be executed for each of the frequency bands.

(8) In the vibration control system according to the present invention, the phase control means is configured to repeat control of the phase characteristic in each frequency band by the KRS control means for a first predetermined time and then control of the phase characteristic in a whole frequency range by the kurtosis control means for a second predetermined time.

Therefore, both types of the control are executed by being divided temporally, and desired results can thereby be obtained.

(9) In the vibration control system according to the present invention, the response KRS calculation means calculates the KRS for each of the frequency bands, and the KRS control means controls the characteristic of the phase for each of the frequency bands.

Therefore, the phases can be controlled collectively for each of the frequency bands.

(10) In the vibration control system according to the present invention, the KRS control means controls standard deviation of phase distribution for each of the frequency components or each of the frequency bands.

Therefore, the control can be executed on the basis of the standard deviation of the phase distribution.

(11) A vibration control method according to the present invention includes: executing a Fourier transform on a response waveform from a vibration sensor to calculate response PSD, the vibration sensor measuring vibration of a test piece vibrated by a vibration generator operating on the basis of a drive waveform; comparing the response PSD and reference PSD and calculating PSD for control such that the response PSD becomes equal to the reference PSD; executing an inverse Fourier transform by applying a phase to each frequency component on the basis of the PSD for control and calculating the drive waveform; calculating kurtosis of the response waveform as response kurtosis; calculating a kurtosis response spectrum (hereinafter KRS) for the response waveform and setting the KRS as response KRS, the KRS indicating transferability of kurtosis at each frequency; and comparing the response kurtosis and reference kurtosis and controlling a characteristic of the phase used for the calculation of the drive waveform such that the response kurtosis becomes equal to the reference kurtosis, and comparing the response KRS and reference KRS and controlling the characteristic of the phase used for the calculation of the drive waveform for each of the frequencies such that the response KRS becomes equal to the reference KRS.

Therefore, the non-Gaussian vibration test can appropriately be conducted by using the kurtosis response spectrum, which indicates the transferability of the kurtosis.

Step S2 in an embodiment corresponds to the "response PSD calculation means".

Step S3 in the embodiment corresponds to the "means for calculating PSD for control".

Steps S4 to S11 in the embodiment correspond to the "drive waveform calculation means".

Step S18 in the embodiment corresponds to the "kurtosis calculation means".

Step S16 in the embodiment corresponds to the "response KRS calculation means".

Steps S17, S19 in the embodiment correspond to the "phase control means".

The "program" is a concept that includes not only a program directly executable by a CPU but also a source-format program, a compressed program, an encrypted program, and the like.

The features of the present invention can be described broadly as set forth above. The structures and characteristics of the present invention will be apparent from the following detailed description of the invention together with those features, effects, and drawings.

BRIEF DESCRIPTION OF THE DRAWINGS

FIGS. 5A to 5D includes graphs illustrating relationships among reference PSD, response PSD, and PSD for control.

FIGS. 6A to 6C includes graphs and a table illustrating a relationship between a reference KRS and a response KRS, and a phase to be given in time series.

FIG. 23 includes graphs illustrating waveforms with the same kurtosis but with different characteristics.

DESCRIPTION OF THE PREFERRED EMBODIMENTS

1. First Embodiment 1.1 Functional Configuration

Figure 1:
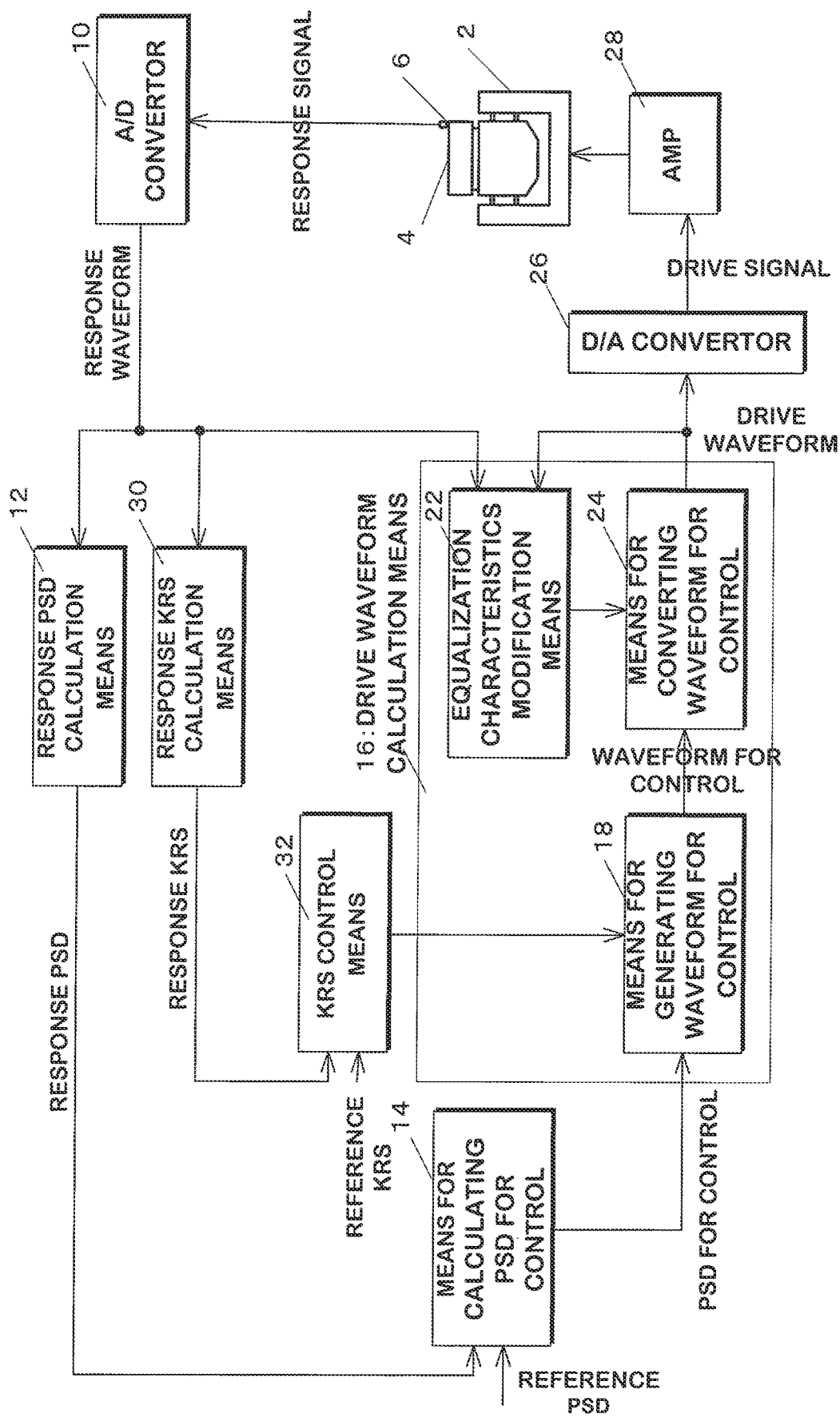
FIG. 1 illustrates a functional configuration of a vibration control system according to an embodiment of the present invention.

FIG. 1 illustrates a functional configuration of a vibration control system according to an embodiment of the present invention. In this embodiment, an amplifier 28, a vibration generator 2, a test piece 4, and an acceleration sensor 6 do not constitute the vibration control system. However, these devices may be included in the vibration control system.

The test piece 4 as a test target is placed on the vibration generator 2. The acceleration sensor 6 detects vibration of the test piece 4 that is vibrated by the vibration generator 2. A response signal from the acceleration sensor 6 is converted into a response waveform as digital data by an A/D convertor 10.

Response PSD calculation means 12 executes a frequency analysis (FFT) of the response waveform, and calculates response power spectral density (PSD) thereof. Means 14 for calculating PSD for control calculates PSD for control on the basis of the response PSD and reference PSD. Here, the reference PSD is PSD that is given as a reference. The means 14 for calculating PSD for control calculates the PSD for control such that the response PSD matches the reference PSD.

This is because, even when the vibration with the reference PSD is applied to the vibration generator 2, the test piece 4 exhibits different vibration from the vibration with the reference PSD due to presence of a transfer characteristic of a system including the vibration generator 2 and the test piece 4, a nonlinear fluctuation of such a system, suitability of control resolution at the time of setting a control system, or the like. For this reason, the means 14 for calculating PSD for control sequentially modifies and calculates the PSD for control such that the response PSD matches the reference PSD.

Drive waveform calculation means 16 generates a drive waveform to be provided to the vibration generator 2 on the basis of an amplitude corresponding to the PSD for control (since the PSD for control is a value obtained by raising the amplitude to the second power, the value of the PSD for control is converted back into the amplitude). Means 18 for generating a waveform for control in the drive waveform calculation means 16 applies an appropriate random phase to each frequency component of the amplitude corresponding to the PSD for control, and thereby generates a waveform for control.

In order to vibrate the test piece 4 with vibration by the waveform for control, the drive waveform is calculated in consideration of a transfer function of the system including the vibration generator 2, and the drive waveform is provided as a drive signal to the vibration generator 2 (this point will be described later).

In this embodiment, kurtosis transferability of the response waveform is calculated for each frequency. This is a new concept proposed by the inventor, and is named a kurtosis response spectrum (hereinafter referred to as a KRS) by the inventor (for more information on the KRS, see Hosoyama, A, Tsuda, K, Horiguchi, S. Development and validation of kurtosis response spectrum analysis for anti-vibration packaging design taking into consideration kurtosis. Packag Technol Sci. 2020; 33: 51 to 64).

Response KRS calculation means 30 calculates the KRS of the response waveform. KRS control means 32 compares a reference KRS as a target and a response KRS, and controls characteristics of the phase used in the means 18 for generating a waveform for control such that the response KRS becomes equal to the reference KRS.

For example, a vibration waveform in environment where the vibration test is desired to be conducted (a truck box of a traveling truck) is obtained, and KRS thereof is calculated. The thus-calculated KRS can be used as the reference KRS.

As described above, the means 18 for generating a waveform for control applies the appropriate random phase to each of the frequency components of the amplitude corresponding to the PSD for control, and thereby generates the waveform for control. The KRS control means 32 controls characteristics of this random phase (for example, standard deviation of phase distribution, and the like) per frequency, and thereby controls the KRS of the waveform for control.

In the case where the test piece 4 can be vibrated according to the thus-generated waveform for control, the test piece 4 can be vibrated by the vibration with the reference KRS while the reference PSD is satisfied. Means 24 for converting a waveform for control deforms the waveform for control on the basis of equalization characteristics, for which the transfer function of the system is taken into consideration, and calculates the drive waveform. Equalization characteristics modification means 22 sequentially updates the equalization characteristics on the basis of the response waveform and the drive waveform.

The calculated drive waveform is converted into the drive signal by a D/A convertor 26, is amplified by the amplifier 28, and is provided to the vibration generator 2.

As it has been described so far, it is possible to execute the control to vibrate the test piece 4 by the vibration with the reference PSD and the reference KRS.

1.2 Hardware Configuration

Figure 2:
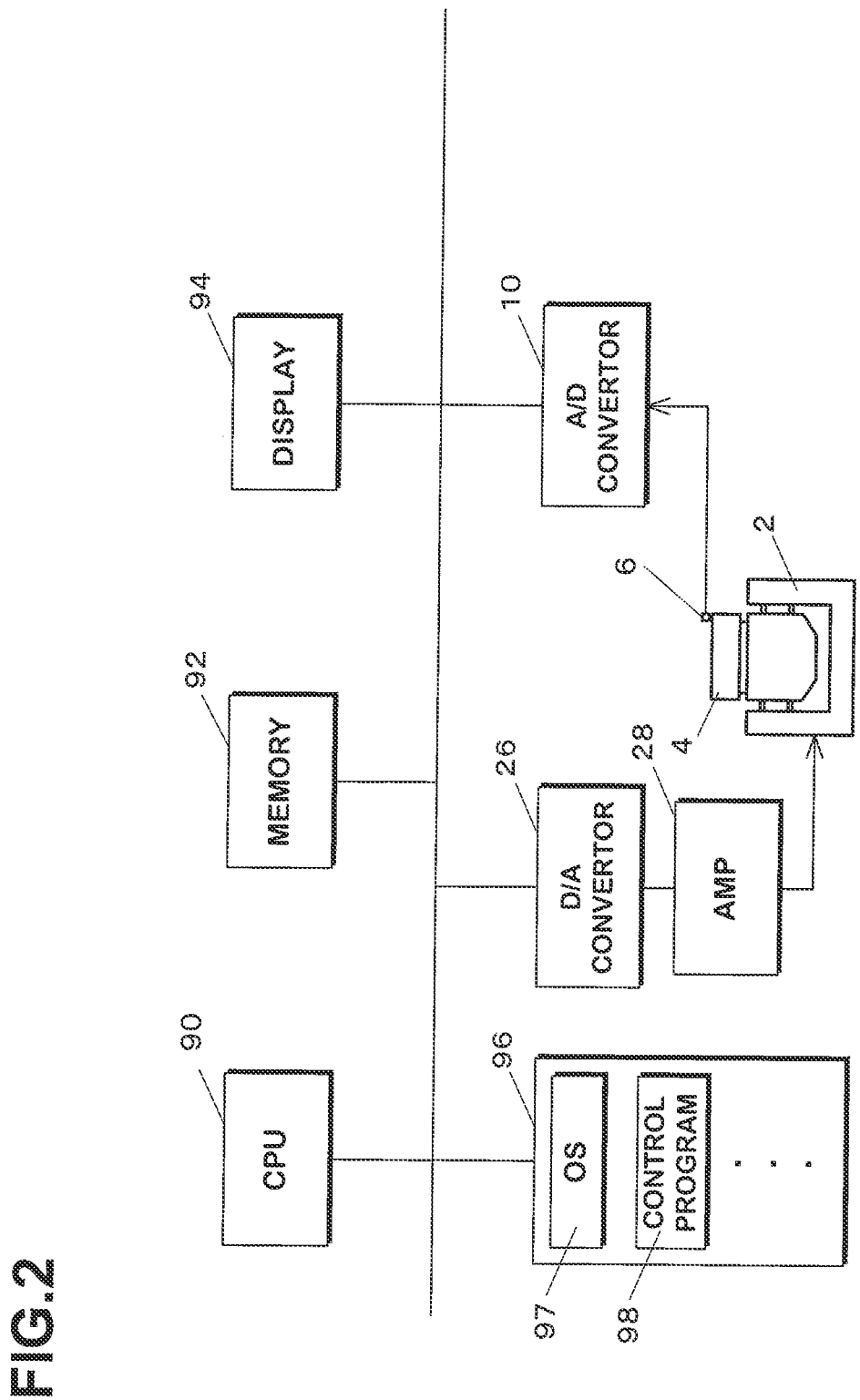
FIG. 2 is a diagram illustrating a hardware configuration.

FIG. 2 illustrates a hardware configuration of the vibration control system. The vibration generator 2 has a vibration table (not illustrated) onto which the test piece 4 is placed and fixed. The vibration generator 2 vibrates this vibration table. In addition, in order to detect this vibration, the test piece 4 is provided with the acceleration sensor 6.

Memory 92, a touchscreen display 94, non-volatile memory 96, the D/A convertor 26, and the A/D convertor 10 are connected to a CPU 90 (may be used in conjunction with a DSP). Output to the vibration generator 2 is provided as an analog signal to the vibration generator 2 via the D/A convertor 26 and the amplifier 28. Meanwhile, input from the acceleration sensor 6 is taken as the digital data via the A/D convertor 10.

The non-volatile memory 96 records an operating system 97 and a control program 98. The control program 98 cooperates with the operating system 97 to exerts functions thereof.

1.3 Vibration Control Processing

Figure 3:
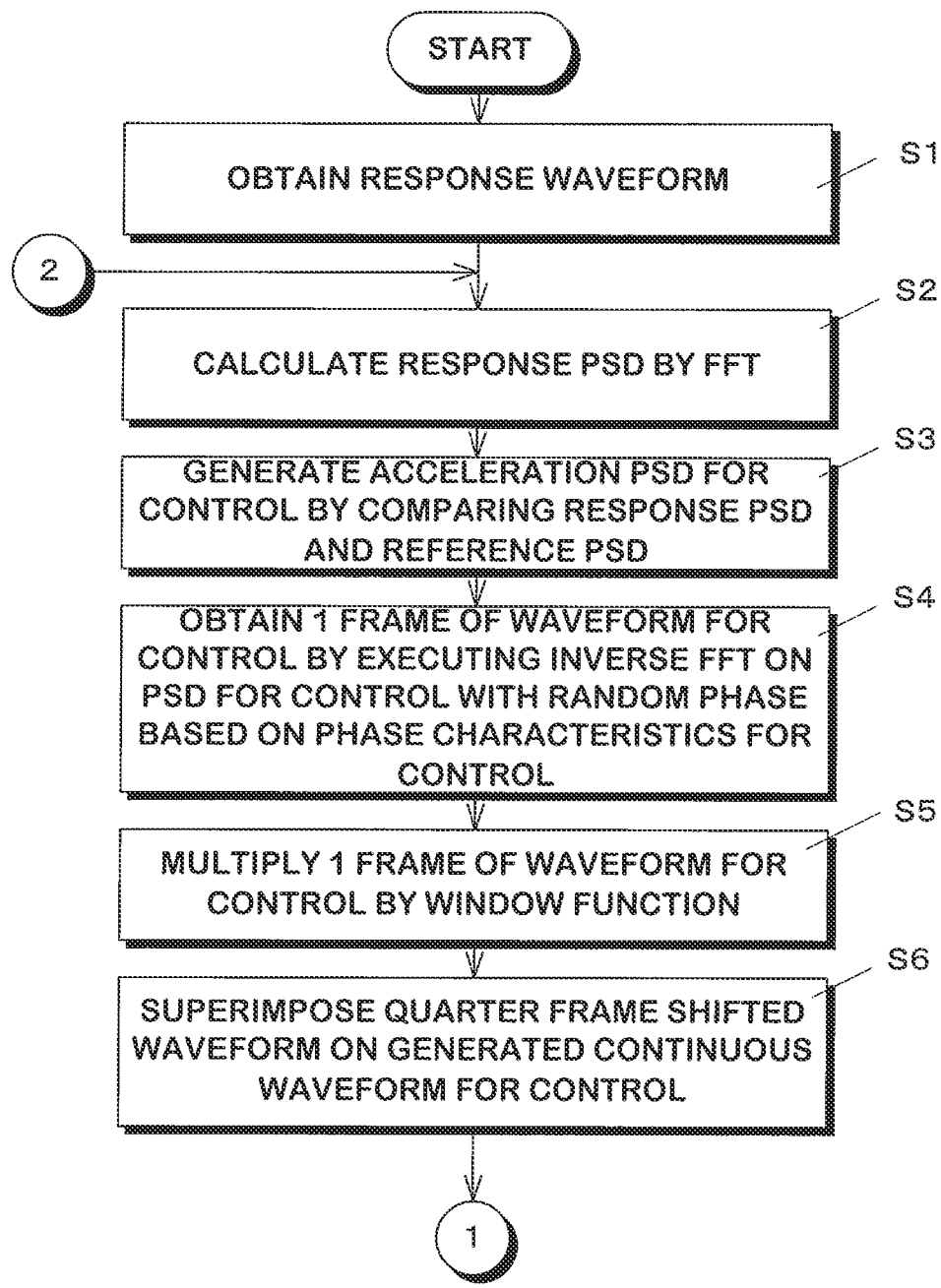
FIG. 3 is a flowchart of a control program 98.
Figure 4:
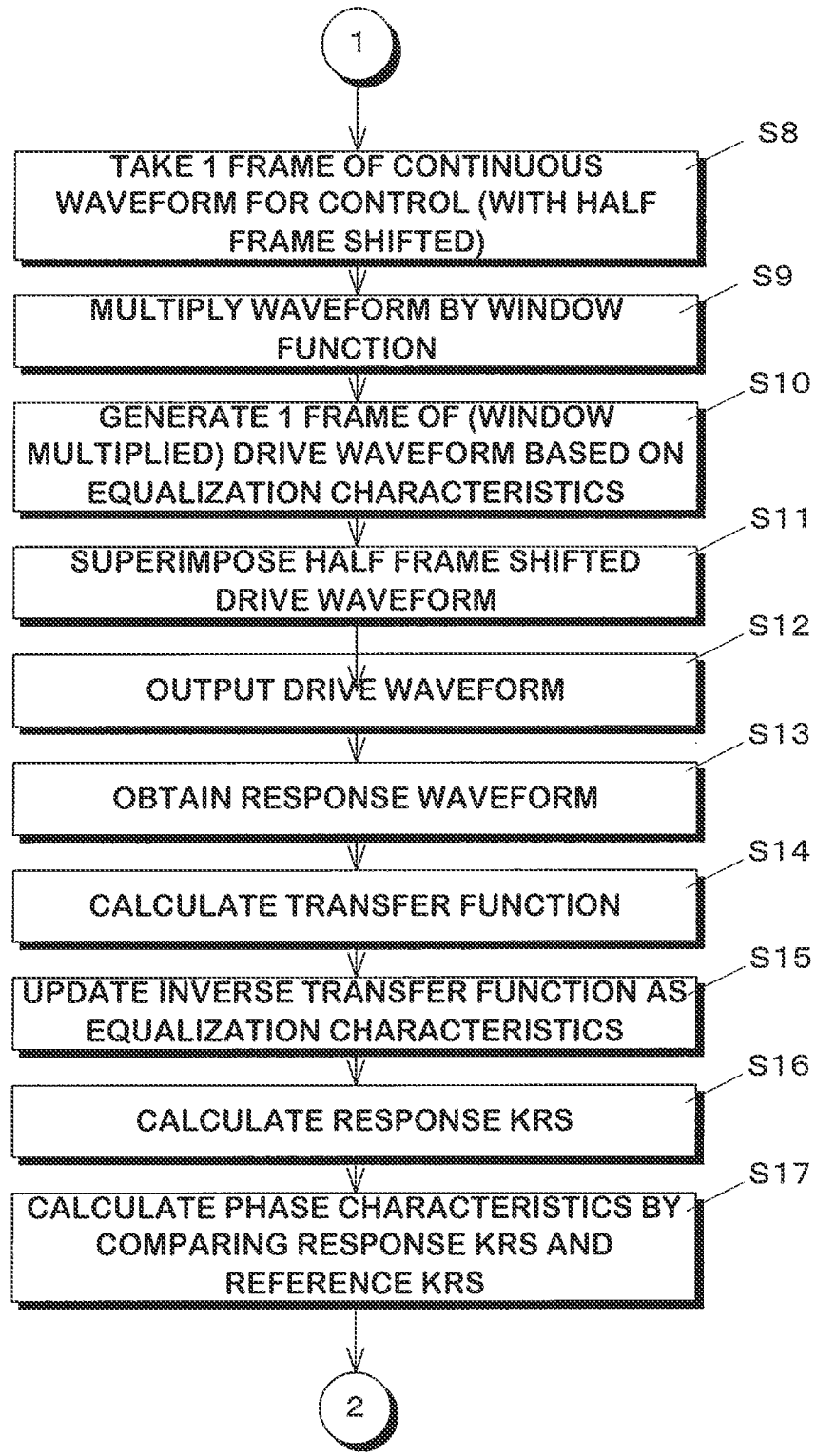
FIG. 4 is a flowchart of the control program 98.

FIG. 3 and FIG. 4 illustrate flowcharts of the control program 98. A description will hereinafter be made on control that is executed in the case where the test piece 4 is applied with the vibration that has reference acceleration PSD as illustrated in FIG. 5A and has the reference KRS as illustrated in FIG. 6A.

The reference PSD and the reference KRS are entered by a user on the touchscreen display 94, and the like, and are recorded in the non-volatile memory 96. Alternatively, the reference PSD and the reference KRS may be imported as data.

Figure 21A:
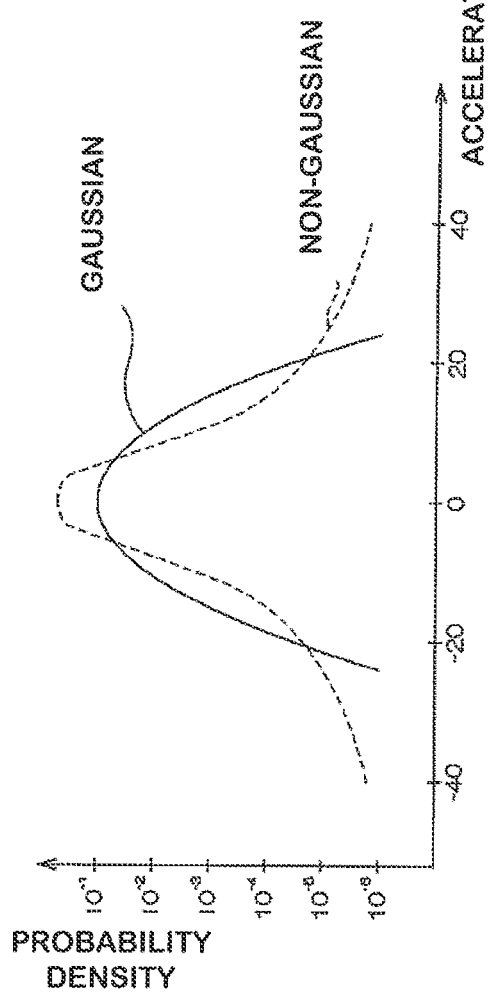
FIGS. 21A to 21C includes graphs illustrating a Gaussian waveform and a non-Gaussian waveform.
Figure 21B:
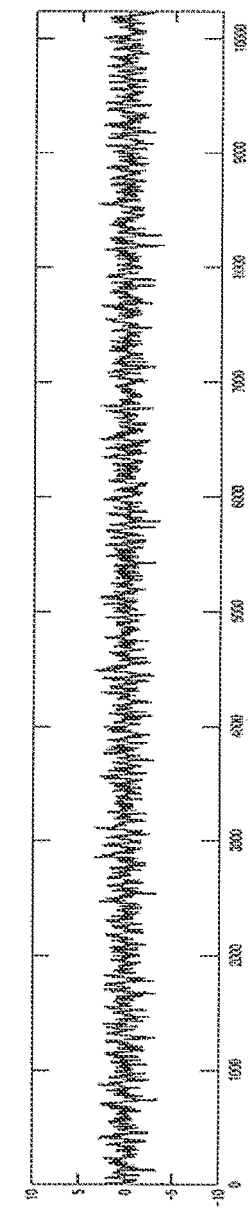
Figure 21C:
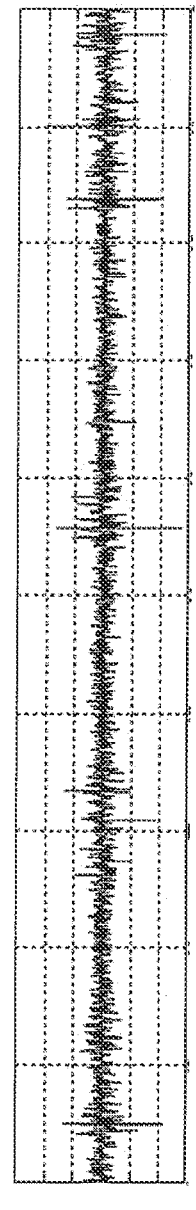
Figure 22:
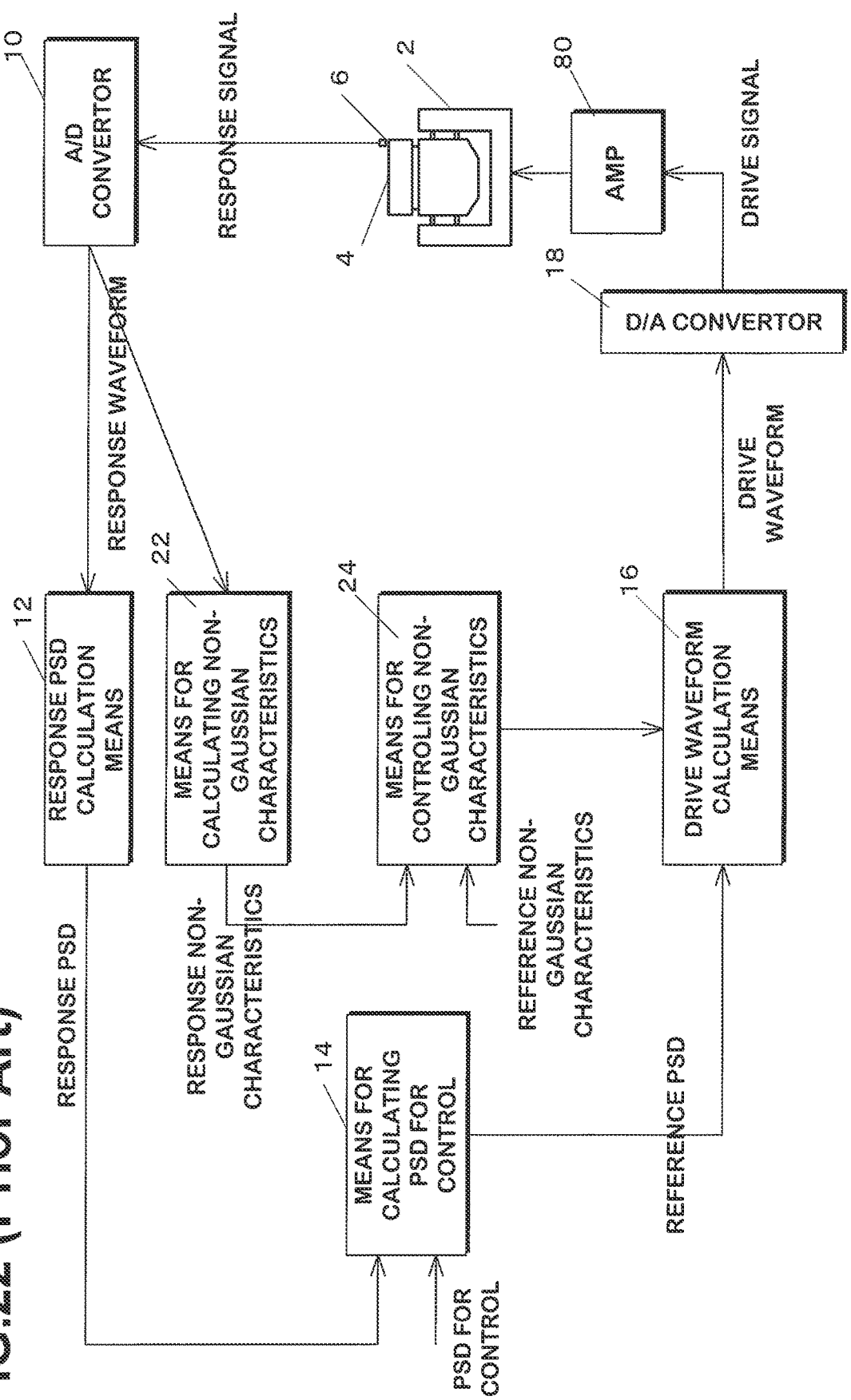
FIG. 22 is a diagram illustrating a conventional vibration control system capable of applying vibration with a non-Gaussian characteristic.

Here, the kurtosis response spectrum (KRS) is the new index proposed by the inventor and representing a non-Gaussian characteristic. Conventionally, kurtosis (K), which represents steepness (or a degree of spread of a base) of probability density distribution of the amplitude of the vibration, has been used as the index of the non-Gaussian characteristic. For example, in the case where a road has an intermittent seam or an intermittent projection, as illustrated in FIG. 21C, an amplitude of a vibration acceleration waveform frequently deviates from an average value. In this case, probability density distribution of such an amplitude does not exhibit Gaussian distribution as indicated by the solid line in FIG. 21A, but exhibits non-Gaussian distribution as indicated by the broken line in FIG. 21A.

Since this difference can be expressed by the kurtosis (K), conventionally, the vibration has been controlled with this kurtosis (K) as a target value, and the test piece 4 has been applied with non-Gaussian vibration having desired K.

However, as illustrated in FIG. 23, it has been understood that the vibration waveforms significantly differ from each other even with the same K. For this reason, the new index proposed by the inventor is the KRS.

Figure 7:
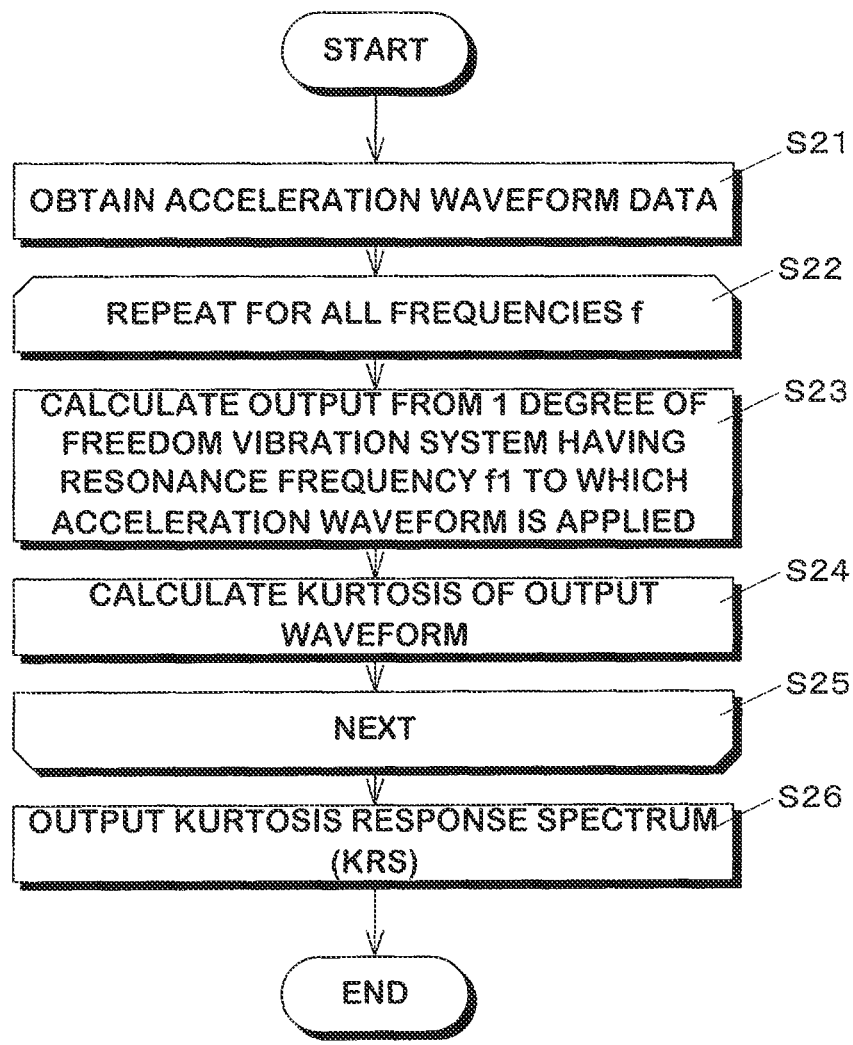
FIG. 7 is a flowchart for calculating KRS.

FIG. 7 illustrates a flowchart for calculating the KRS. In this embodiment, as one function of the control program 98, the PSD and the KRS can be calculated.

The CPU 90 obtains acceleration waveform data as a target for calculating the KRS (Step S21). For example, in the case of simulating the vibration during transportation by the truck, actually-measured acceleration waveform data of the vibration of the truck box is obtained, and the KRS thereof can be calculated by the following processing. This KRS can be used as the reference KRS during the vibration test.

Figure 8:
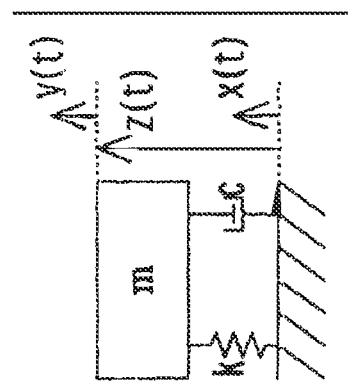
FIG. 8 is a schematic view of a one-degree-of-freedom vibration system constructed of a spring-mass-damper system.

The CPU 90 calculates output at the time when this acceleration waveform is applied to a one-degree-of-freedom vibration system having a resonance frequency f1 (Step S23). FIG. 8 schematically illustrates the one-degree-of-freedom vibration system. The CPU 90 calculates output y(t) at the time of applying input x(t) to a system having a spring k, a damper c, and mass m. A resonance frequency f of this system is determined by the spring k and the mass m.

Next, the CPU 90 calculates kurtosis K for the probability density distribution of the amplitude of the above output waveform (step S24). The kurtosis K is calculated by the following equation.

$$K = \frac{n\sum_{i=1}^{n}(x_i - \bar{x})^4}{\left(\sum_{i=1}^{n}(x_i - \bar{x})^2\right)^2}$$

Here n is the number of samples of the waveform amplitude, $x_i$ is the amplitude of the waveform, and x is an average value of the waveform amplitude.

The CPU 90 executes the above processing by changing the resonance frequency of the system, so as to obtain the kurtosis K for each of the resonance frequencies (step S22, S25). In the case where the CPU 90 executes the above processing for all the frequencies, the spectrum of the kurtosis can be obtained. This is the kurtosis response spectrum KRS. The CPU 90 outputs this KRS (step S26).

The KRS of the actually-measured acceleration waveform can be obtained and used as the reference KRS.

Figure 9A:
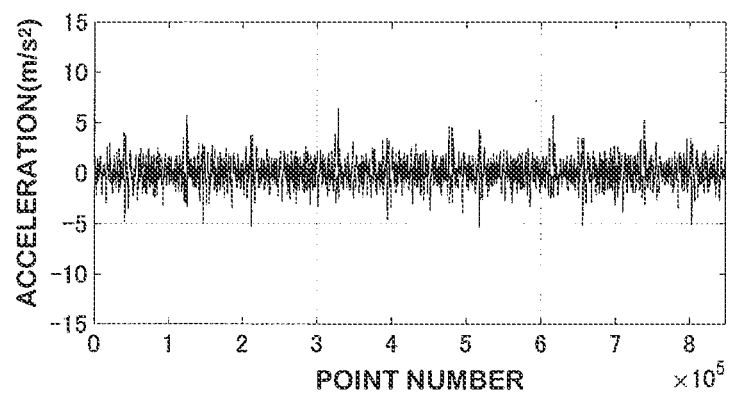
FIGS. 9A to FIG. 9C illustrate examples of different vibration waveforms with the same kurtosis.

FIGS. 9A, B, and C illustrate three vibration waveforms with the same PSD and the same kurtosis K (same as those illustrated in FIG. 23). As illustrated in FIGS. 9A, B, and C, it is understood that the vibration waveforms significantly differ from each other even with the same kurtosis K. Accordingly, in the case where the vibration test is performed with K as the target, it may be impossible to appropriately conduct the test. For example, FIG. 9A illustrates a waveform of the actually-measured vibration. However, the test is possibly conducted by using the vibration with the same K, which is illustrated in FIG. 9B or FIG. 9C.

Figure 9B:
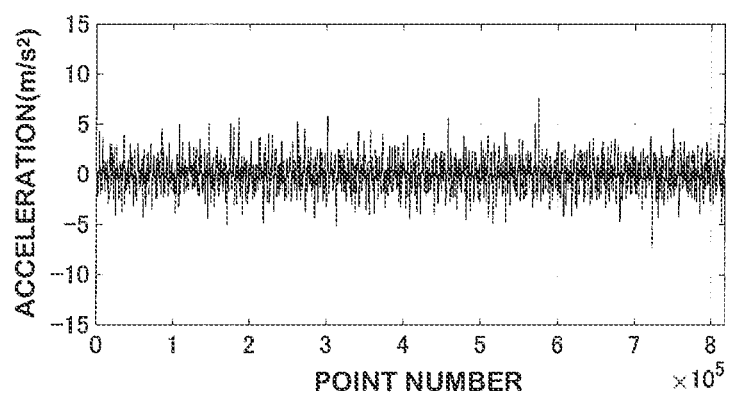
Figure 9C:
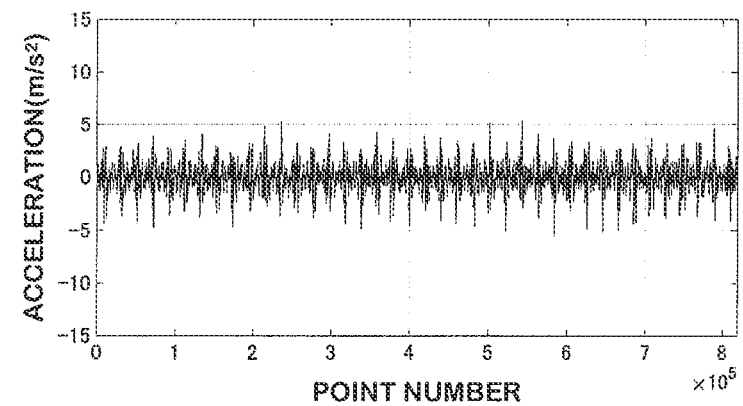
Figure 9D:
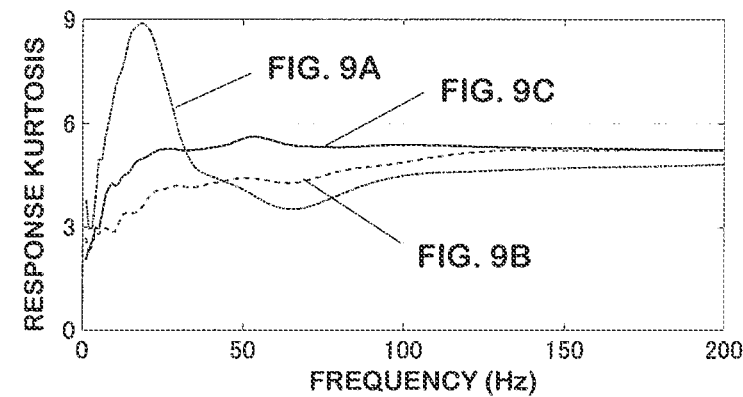
FIG. 9D is a graph illustrating KRS thereof.

FIG. 9D illustrates the KRS of the waveforms in FIG. 9A, FIG. 9B, and FIG. 9C. The KRS of the three waveforms clearly differ from each other. In addition, it is clarified from this that the KRS clearly represents the characteristic of the non-Gaussian waveform.

A description will hereinafter be made on how to execute the control processing on the basis of the reference PSD and the reference KRS, which are set, with reference to FIG. 3 and FIG. 4.

The CPU 90 obtains the response waveform for a predetermined time (called one frame) from the acceleration sensor 6 via the A/D convertor 10 (step S1). Furthermore, the CPU 90 executes a fast Fourier transform (FFT) on this response waveform to calculate the response PSD (step S2). An example of the calculated response PSD is illustrated in FIG. 5B. In this embodiment, the response PSD is calculated for one frame of the response waveform. However, the response PSD may be calculated for the predetermined number of past frames of the response waveform.

Next, the CPU 90 compares the response PSD and the reference PSD, and modifies the PSD for control such that the response PSD matches the reference PSD (step S3). For example, it is assumed that the PSD for control at the time of obtaining the above response PSD is as illustrated in FIG. 5C. In other words, it is assumed that, when the vibration generator 2 is operated with the vibration generated on the basis of this PSD for control, the response PSD illustrated in FIG. 5B is obtained.

The response PSD illustrated in FIG. 5B has a portion that does not match the reference PSD. The CPU 90 compares a magnitude of such a portion for each of the frequency components (called line). In the case where the response PSD falls below the reference PSD for each of the frequency components, the CPU 90 increases the PSD for control. On the other hand, in the case where the response PSD exceeds the reference PSD, the CPU 90 reduces the PSD for control (FIG. 5C). The CPU 90 makes such a modification to calculate new PSD for control as illustrated in FIG. 5D.

The CPU 90 determines an amplitude component of an acceleration spectrum from this PSD for control, applies the appropriate random phase to each of components A1 to Aq, and executes an inverse fast Fourier transform (inverse FFT) on the PSD for control, so as to obtain one frame of a waveform for control (Step S4). Preferably, in regard to the random phase used at this time, phases φ1 to φq, which are respectively applied to the frequency components A1 to Aq at the time of generating one frame of the waveform for control, are not only random, but phases φk(t), φk(t+1) . . . are random when a specific frequency component Ak is focused and the phase applied thereto is seen in time series.

In this embodiment, the control is executed such that the phases φk(t), φk(t+1) . . . in the time series applied to each of the frequency components are not only uniform random numbers but also are random numbers following normal distribution with predetermined standard deviation σ. In this embodiment, the standard deviation σ is calculated as a phase characteristic for control by processing, which will be described below.

Figure 10A:
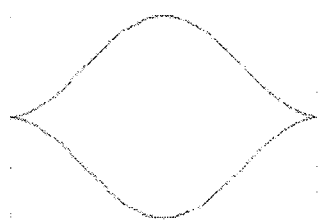
FIGS. 10A to 10F includes views illustrating processing to generate a control waveform.
Figure 10B:
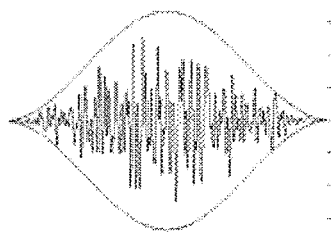
Figure 10C:
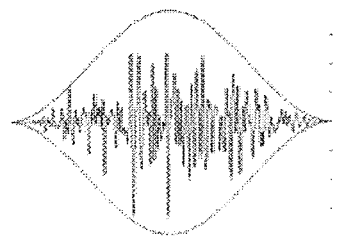
Figure 10D:
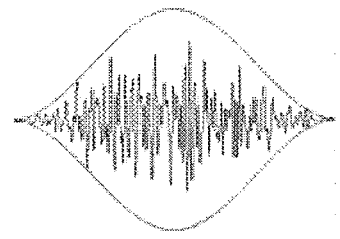
Figure 10E:
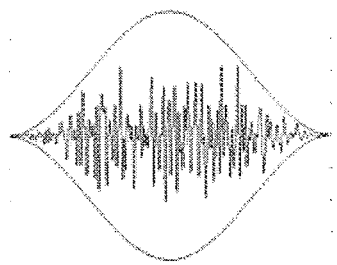

Once the waveform for control is obtained as described so far, the CPU 90 multiplies one frame of the waveform for control by a window function (Step S5). For example, as illustrated in FIG. 10A, a function that takes "0" at a start time point and an end time point of one frame and has a maximum value at a central time point is used. In addition, such a function is preferred that, when the functions are each shifted by a certain width and are superimposed, a sum of the functions is "1" at all time points.

A property that should be provided to the window function used at this time has been described in Japanese Examined Patent Application HEI6(1994)-5192. In addition, the processing is executed to shift waveform data in the form of a wave packet, which is generated by multiplication by the window function, by 1/M of a frame width and superimpose the waveform data. At this time, a value of M must satisfy a certain condition that is determined by characteristics of the window function to be used. Just as described, there is a certain degree of freedom in selection of the window function and the numerical value M. However, in general, a Hanning window function is frequently used, and a minimum possible value of M in such a case is 4. Also, in this specification, a case of M=4 will be exemplified.

By continuing the operation to shift and superimpose the waveforms for control, each of which is multiplied by the window function, the waveforms for control (pseudo-random waveforms) with discrete spectra are connected one frame each in a consistent manner, and the continuous waveform for control is thereby generated. Due to absence of intervals, this waveform data is a true irregular waveform (true random waveform) and thus has the continuous spectrum. In addition, since the waveform converges smoothly to "0" at the start time point and the end time point of the frame, no extra frequency component is presented at a connection point.

Figure 10F:
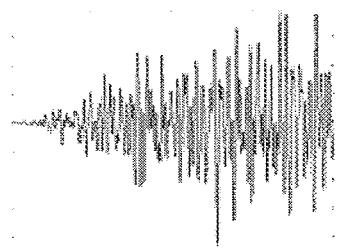

The CPU 90 shifts the waveforms for control, each of which is multiplied by the window function just as described, by a quarter frame and superimposes the quarter-frame shifted waveforms for control (Step S6). Accordingly, when the processing in steps S1 to S6 is repeatedly executed, as illustrated in FIGS. 10B to 10E, the quarter-frame shifted waveforms are superimposed, and thus the continuous waveform for control as illustrated in FIG. 10F can be obtained.

Next, the CPU 90 executes control for vibrating the test piece 4 as per the continuous waveform for control. However, in the case where a drive signal generation step, which immediately follows the above control, is executed as is in one frame unit, a discontinued portion is possibly generated at the connection point of the frames. To handle such a problem, the following overlap processing is executed (steps S8 to S11). In the overlap processing, the waveform data is taken out by shifting a take-out start point by half a frame, and is multiplied by the window function to obtain the waveforms. Then, a drive signal waveform is created by convolving an impulse response (an inverse function of the transfer function) as the equalization characteristic with the waveforms. Thereafter, those waveforms are again sequentially shifted by half a frame, superimposed, and connected. This processing will be described in detail below.

The CPU 90 takes out one frame of the waveform for control from the continuous waveform for control (step S8). Then, the CPU 90 multiplies the taken waveform for control by the window function (step S9).

Next, the CPU 90 convolves the impulse response as the equalization characteristic with one frame of the waveform for control, which is multiplied by the window function, so as to generate the drive signal (step S10). In this embodiment, as the equalization characteristic, an inverse characteristic of the transfer function of the system including the vibration generator 2 and the test piece 4. In other words, the test piece 4 can be vibrated with the waveform for control by providing, as the drive waveform, the waveform that is obtained by convolving the inverse characteristic of the transfer function with the waveform for control. The impulse response that corresponds to the inverse characteristic of the transfer function may be used as the equalization characteristic.

The CPU 90 keeps executing the overlap processing by superimposing the half-frame shifted drive waveforms, each of which is multiplied by the window function, and connects the thus-obtained drive signals (step S11). The CPU 90 obtains the continuous drive waveform, just as described, and outputs the continuous drive waveform to the amplifier 28 via the D/A convertor 26 (step S12).

Accordingly, the drive signal that is amplified by the amplifier 28 is provided to the vibration generator 2, and the vibration generator 2 can thereby vibrate the test piece 4.

Next, the CPU 90 obtains the response waveform from acceleration sensor 6 (step S13). Then, based on the provided drive waveform and the corresponding response waveform, the CPU 90 calculates the transfer function of the system (step S14). More specifically, the CPU 90 executes the FFT on the response signal to calculate a response spectrum (including phase information), and executes the FFT on the drive waveform to calculate a drive spectrum (including the phase information). From the response spectrum and the drive spectrum, the CPU 90 calculates the transfer function as a ratio between the response spectrum and the drive spectrum.

Next, the CPU 90 updates an inverse of the calculated transfer function as the equalization characteristic (step S15). This equalization characteristic is used when the drive signal is generated next time.

Furthermore, the CPU 90 calculates the KRS of the response waveform, which is obtained from the acceleration sensor 6, and sets the KRS as the response KRS (step S16). KRS calculation processing is as illustrated in FIG. 7.

The CPU 90 executes control to compare the response KRS and the reference KRS and to change the standard deviation σ of the random phases φk(t), φk(t+1) . . . in the time series following the normal distribution applied to each of the frequency components, so as to equalize the response KRS to the reference KRS. If necessary in control, the uniform random number or the like may be used instead of the random number of the normal distribution (the same will be applied below).

In the case where the standard deviation σ is reduced, the phase φ will be biased toward a center value m (set as π in this embodiment). On the contrary, in the case where the standard deviation σ is increased, the phase φ is dispersed. In the case where the phase is applied by the most evenly dispersed uniform random number, the KRS of the thus-generated waveform for control becomes small on average. Meanwhile, in the case where the standard deviation σ is reduced for a certain frequency component and is applied with the phase, the KRS in the frequency component of the waveform for control becomes large.

Accordingly, in this embodiment, for each frequency, the response KRS is compared to the reference KRS. In the case where the response KRS is smaller than the reference KRS, the standard deviation σ is reduced. On the other hand, in the case where the response KRS is larger than the reference KRS, the standard deviation σ is increased.

For example, as illustrated in FIG. 6B, it is assumed that the response KRS deviates from the reference KRS. In this case, for example, since the response KRS is larger than the reference KRS at a frequency fk, the standard deviation σ is changed to be increased.

A description will be made on setting of the phase at the frequency fk with reference to FIG. 6C. The current time is set to t0. The previous processing is indicated by t−1. The processing that is 100 times before the current processing is indicated by t−100. In this embodiment, the processing for 100 times is used as one unit to control the KRS.

Thus, the above-described response KRS is an average value of the KRS of the response waveforms for 100 times. It is assumed that the standard deviation σ is set to 2 in 100 times of the processing. Accordingly, the phases from t−100 to t0 are the random numbers generated by the normal distribution with the standard deviation σ=2.

As a result, as illustrated in FIG. 6B, such a result is obtained that the response KRS becomes larger than the reference KRS. Thus, the standard deviation σ is increased to be larger than 2 (for example, to 2.5).

Such processing is executed for all the frequencies. As a result, the standard deviation σ is determined for each of the frequencies, and is used as the phase characteristic for control in step S4.

For each of the next 99 times of the processing t1 to t99, the CPU 90 generates the phase by the random number that follows the normal distribution of the standard deviation σ applied for each of the frequencies. By using the generated phase, the inverse FFT is executed in step S4, and the waveform for control is thereby generated.

As it has been described so far, it is possible to apply the vibration satisfying the reference PSD and the reference KRS to the test piece 4.

1.4 Other Modifications (1) In the above embodiment, in order to control the KRS, the random phase is generated by the normal distribution, and the standard deviation of the normal distribution is changed. In other words, the standard deviation of the normal distribution is used as the phase characteristic for control. However, a characteristic such as Cauchy distribution may be used for the control.

Figure 11:
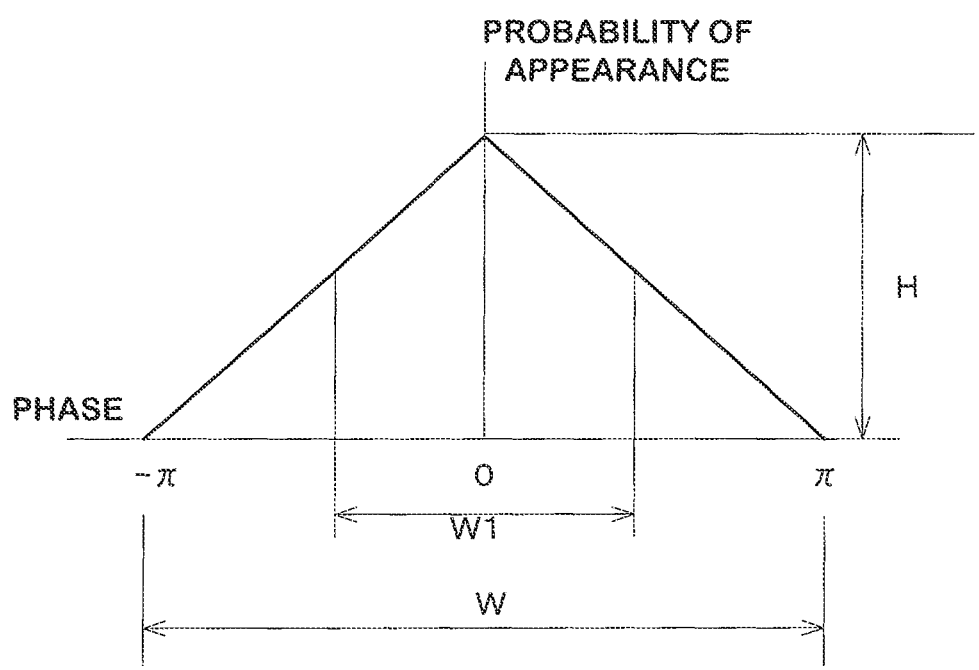
FIG. 11 is a graph schematically illustrating probability density distribution of the phase.

In addition to the standard deviation, a shape of the distribution (which does not have to be the normal distribution) may be set, and the control may be executed on the basis of this shape. For example, as illustrated in FIG. 11, desired probability density distribution (triangular in the drawing but can be of any shape) may be set, and the KRS may be controlled according to a height H or a width W thereof or both of them. In this case, the KRS is increased when the height H increased. On the other hand, the KRS is reduced when the height H is reduced. In addition, the KRS is reduced when the width W is increased. On the other hand, the KRS is increased when the width W is reduced.

Furthermore, the control may be executed on the basis of a width W1 that is obtained when a predetermined percentage (for example, 80%) is included. The KRS is reduced as the width W1 is increased. On the other hand, the KRS is increased as the width W1 is reduced.

(2) In the above embodiment, the KRS is controlled for each of the individual frequency components. However, the KRS may collectively be controlled for each frequency band. For example, as indicated by a solid line in FIG. 12A, the frequencies are divided into the eight frequency bands, so as to set the reference KRS. In this case, the response KRS is also calculated for each of the frequency bands by using an average value, and the like.

In the above embodiment, the standard deviation σ of the normal distribution is adjusted for the random phase of each of the predetermined number of times (t1 to t99). However, in this case, in one time of the control, the standard deviation σ of the normal distribution may be adjusted for the random phase that is applied to each of the frequency components from a lower limit frequency fL to an upper limit frequency fU in the frequency band.

Figures 12A, 12B:
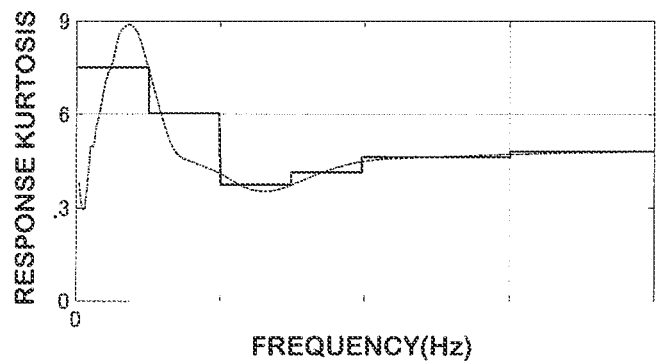
FIGS. 12A to 12B includes a graph and a table illustrating an example in which the reference KRS is calculated for each frequency band.

More specifically, as illustrated in FIG. 12B, the random phase is applied to each of the components of the lower limit frequencies f1 to f50 in the frequency band, and the standard deviation σ at this time is adjusted. In this way, the KRS can be controlled each time instead of the control executed every predetermined number of times.

Figure 13:
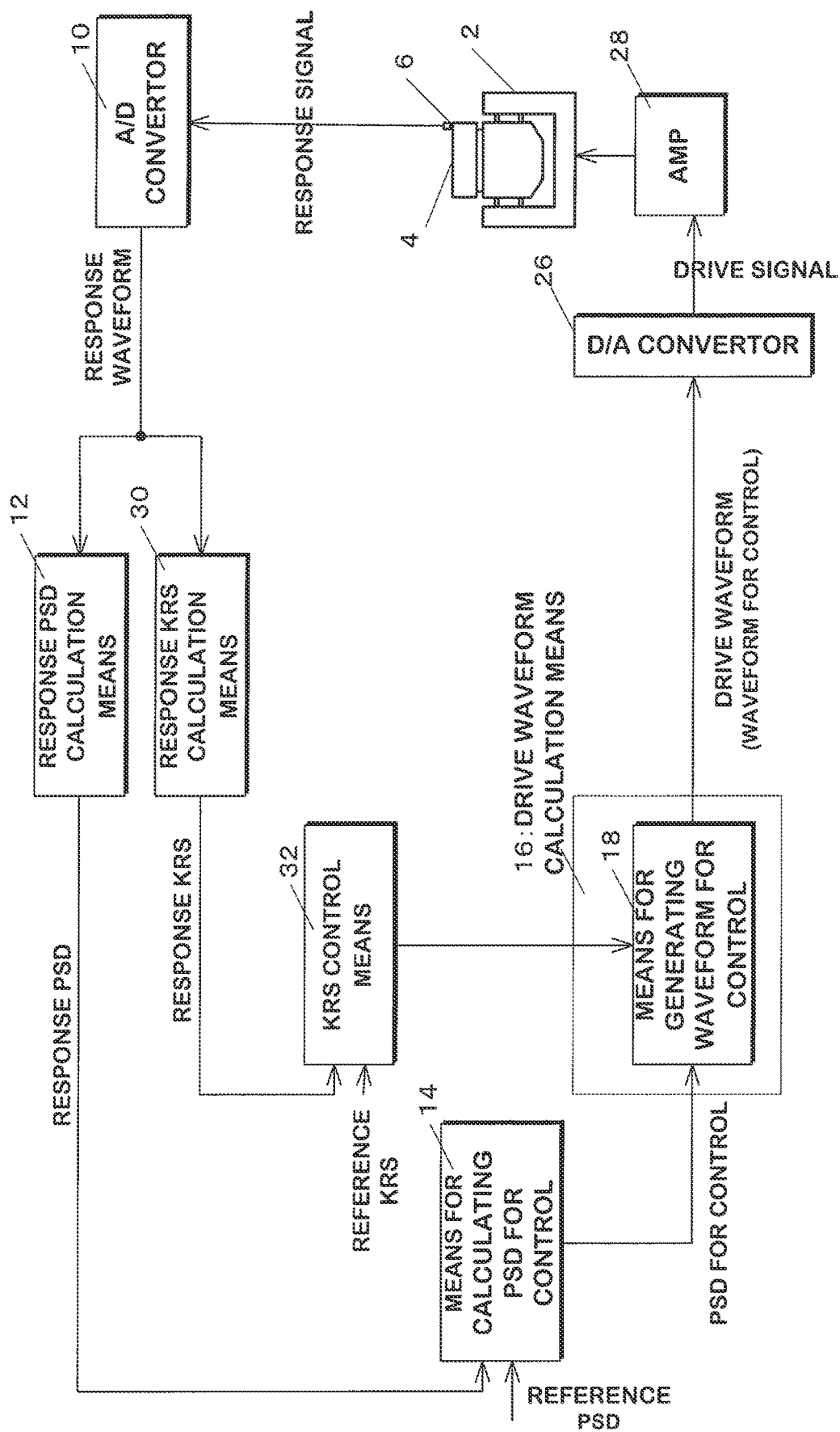
FIG. 13 illustrates a functional configuration of a vibration control system in another example.

(3) In the above embodiment, the drive waveform is calculated by multiplying the waveform for control by the inverse of the equalization characteristic of the system. However, as illustrated in FIG. 13, the waveform for control may be used as is as the drive waveform.

Figure 14:
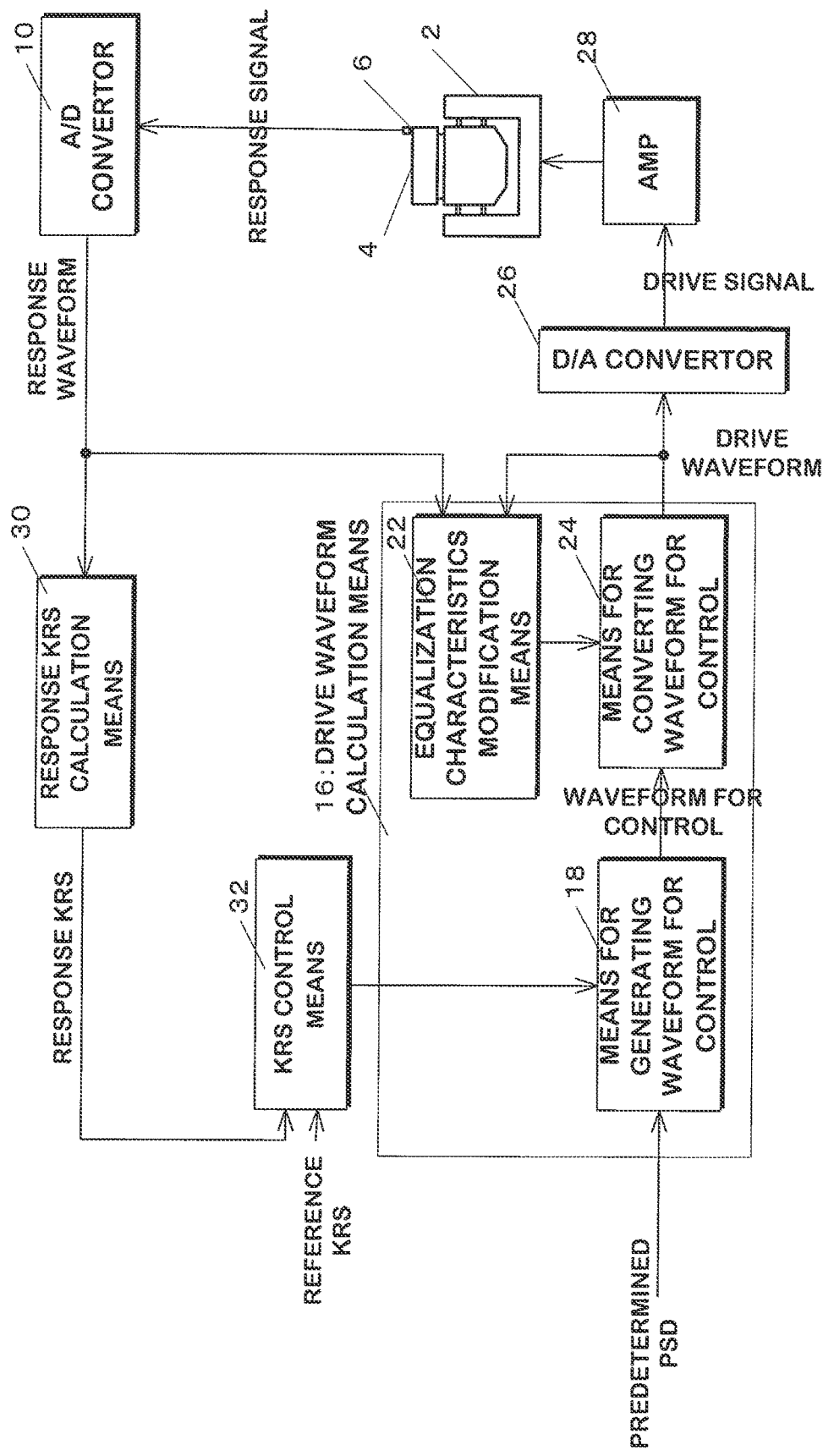
FIG. 14 illustrates a functional configuration of a vibration control system in yet another example.

In addition, as illustrated in FIG. 14, such control to make the response PSD match the reference PSD may not be executed, and only the control to make the response KRS match the reference KRS may be executed. Since the PSD does not have to be controlled, the desired PSD (for example, white noise) may be provided to the means 18 for generating a waveform for control. Also, in this case, as illustrated in FIG. 13, the waveform for control may be used as is as the drive waveform.

(4) The above embodiment and the modifications thereof can be implemented in combination with another embodiment or a modifications thereof as long as not contradicting the essentiality thereof.

2. Second Embodiment 2.1 Functional Configuration

Figure 15:
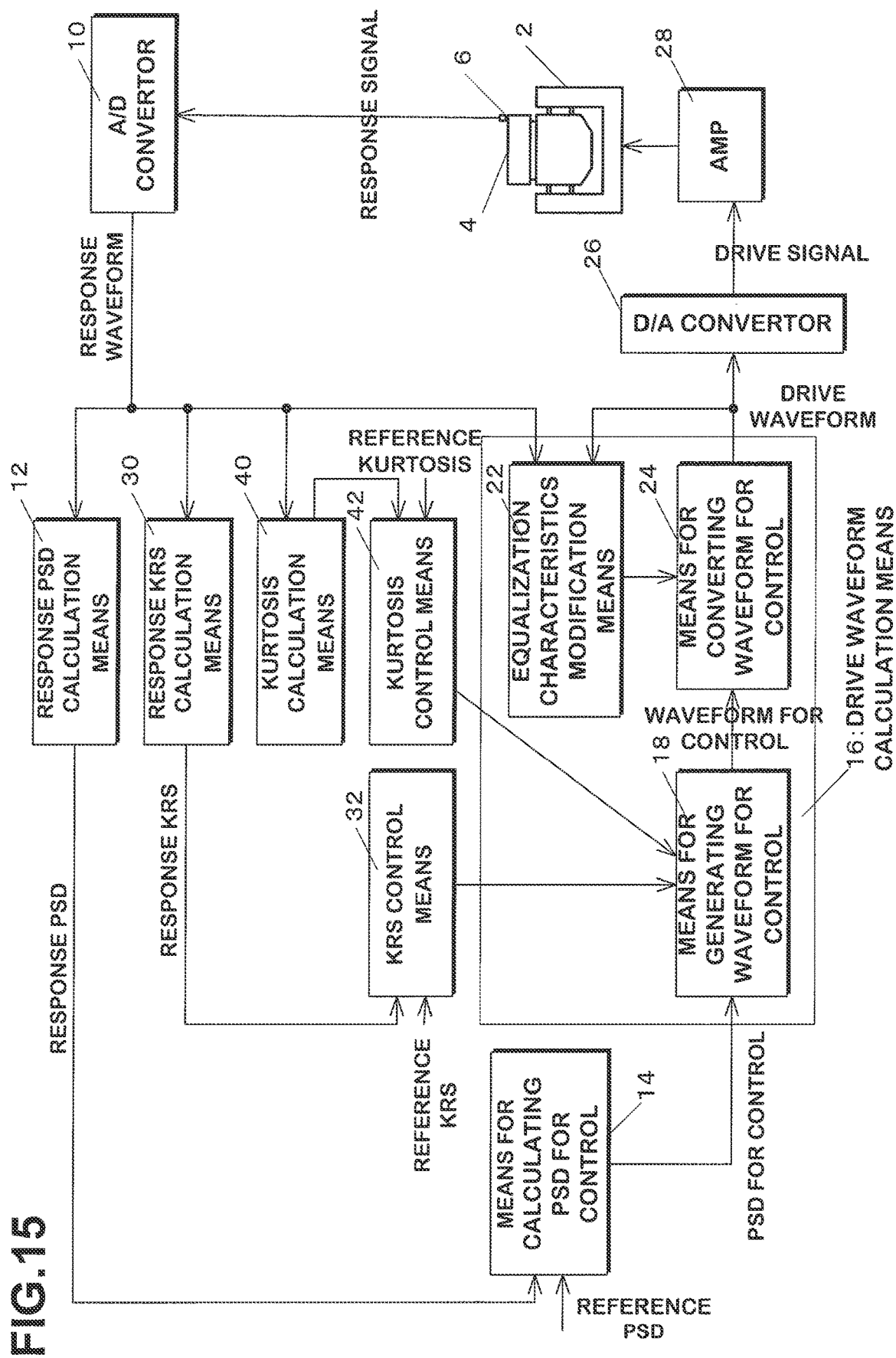
FIG. 15 illustrates a functional configuration of a vibration control system according to a second embodiment.

FIG. 15 illustrates a functional configuration of a vibration control system according to a second embodiment. In this embodiment, the kurtosis is also controlled. In the currently conducted non-Gaussian vibration test, the kurtosis is frequently specified. In this embodiment, not only the KRS but also the kurtosis can be controlled. In other words, in the first embodiment, the KRS control means 32 constitutes phase control means. However, in this embodiment, the KRS control means 32 and kurtosis control means 42 constitute the phase control means.

Kurtosis calculation means 40 calculates the kurtosis of the response waveform as response kurtosis. The kurtosis control means 42 compares reference kurtosis provided as a target and the calculated response kurtosis, and controls characteristics of the phase used in the means 18 for generating a waveform for control such that the response kurtosis matches the reference kurtosis.

The kurtosis calculation means 40 calculates the kurtosis as a whole regardless of the frequency components of the response waveform. The kurtosis control means 42 uniformly increases or reduces the standard deviation of the random phase for all the frequencies. In other words, since the KRS control means 32 controls the standard deviation of the random phase per frequency (per frequency band), the standard deviation differs by frequency. The kurtosis control means 42 executes the control by increasing or reducing the standard deviation over all of the frequencies while maintaining this difference in the standard deviation by frequency.

2.2 Hardware Configuration

A hardware configuration is the same as that illustrated in FIG. 2.

2.3 Vibration Control Processing

Figure 16:
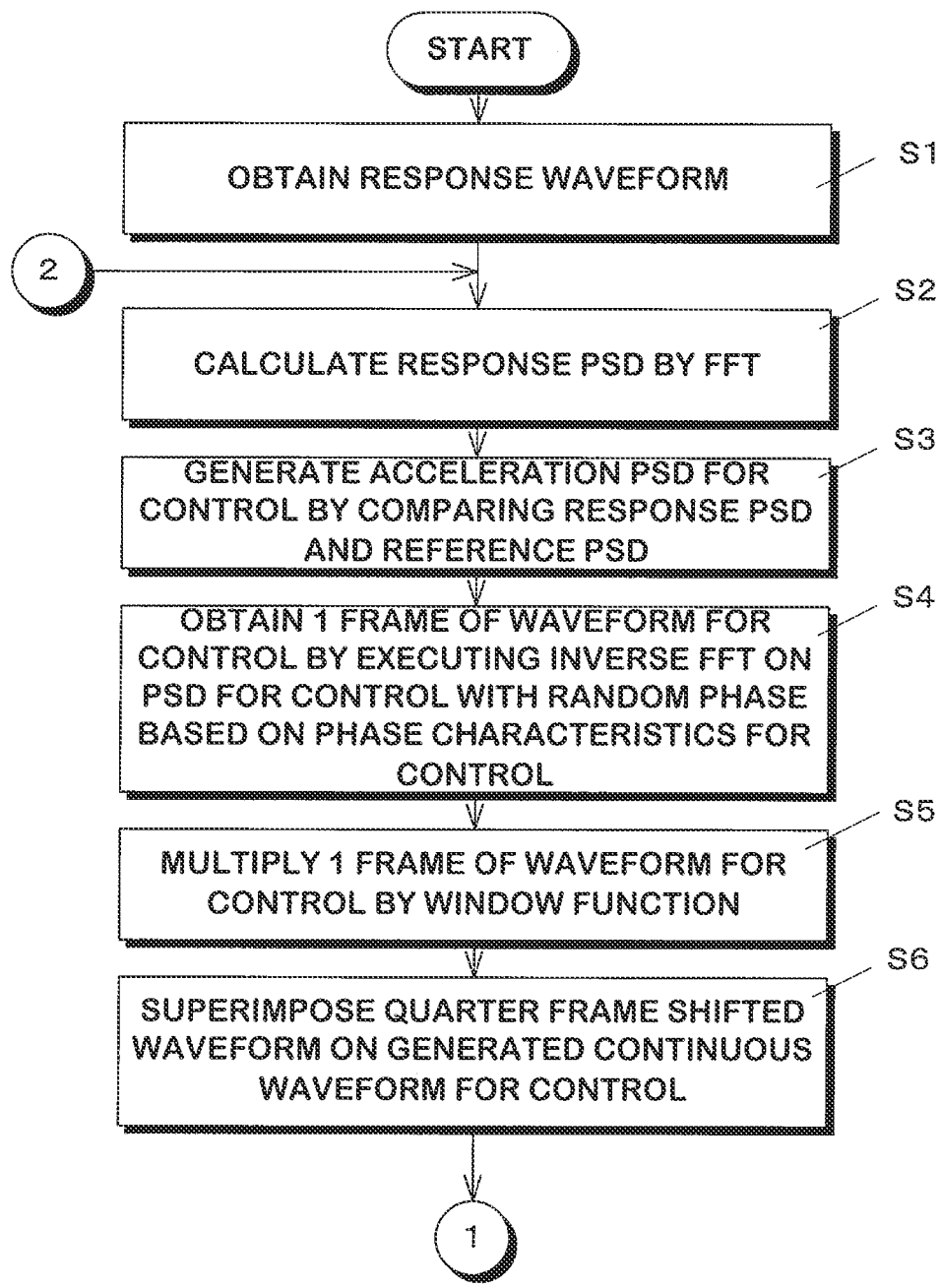
FIG. 16 is a flowchart of the control program 98.
Figure 17:
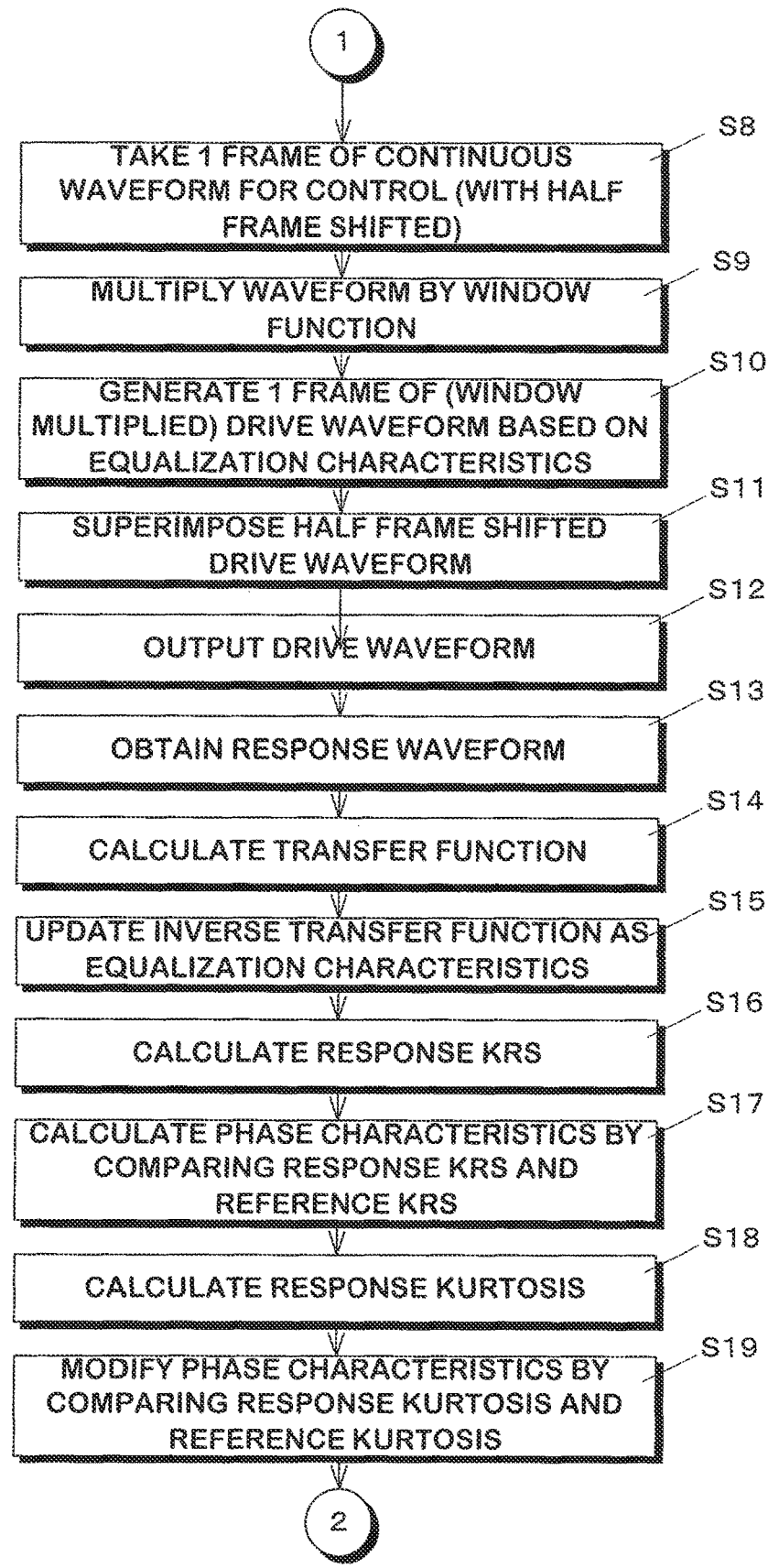
FIG. 17 is a flowchart of the control program 98.

FIG. 16 and FIG. 17 illustrate flowcharts of the control program 98. The processing in steps S1 to S17 are the same as that in the first embodiment.

The CPU 90 calculates the standard deviation σ of the random phase for each of the frequencies on the basis of the deviation of the response KRS from the reference KRS (step S17). Next, the CPU 90 modifies this standard deviation a of the random phase for each of the frequencies on the basis of the response kurtosis. The following description will be made on this processing.

The CPU 90 calculates the kurtosis of the response waveform as the response kurtosis (step S18). Next, the CPU 90 compares the response kurtosis and the reference kurtosis (the kurtosis as the target set by the user), and modifies the standard deviation σ of the random phase for each of the frequencies, which is calculated in step S17, such that the response kurtosis matches the reference kurtosis.

Figure 18A:
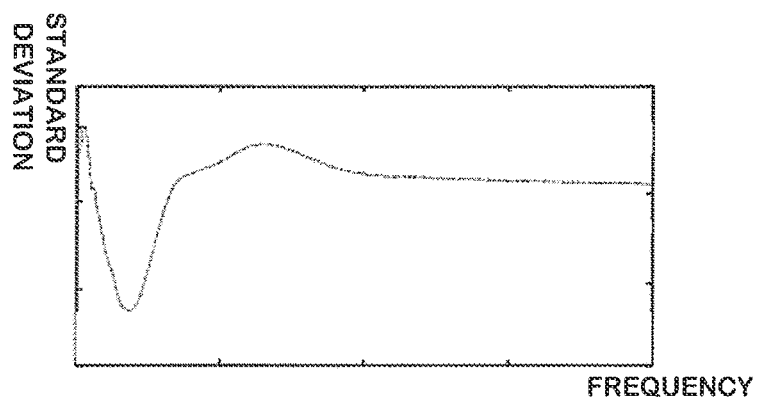
FIGS. 18A to 18C includes graphs illustrating an example of a case where standard deviation of the phase determined by KRS control means is modified by kurtosis control means.
Figure 18B:
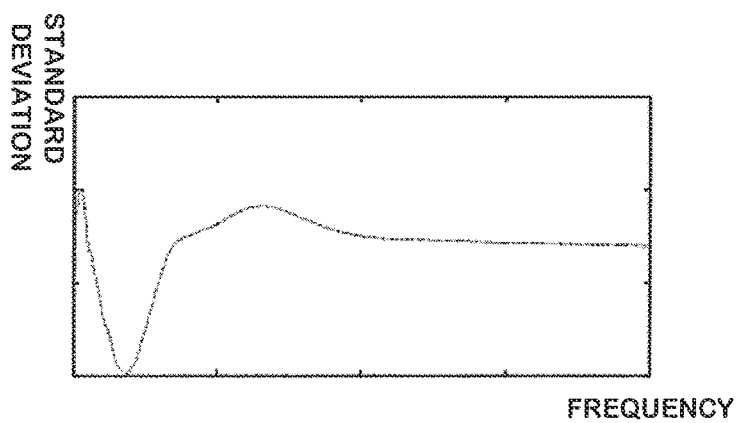

More specifically, in the case where the response kurtosis is smaller than the reference kurtosis, the standard deviation σ of the random phase is slid in a reducing direction for all the frequencies. In this way, while the difference in the standard deviation σ per frequency, which is calculated in step S17 and illustrated in FIG. 18A, is maintained, the standard deviation σ as illustrated in FIG. 18B can be reduced as a whole.

Similarly, in the case where the response kurtosis is larger than the reference kurtosis, the standard deviation σ of the random phase is slid in an increasing direction for all the frequencies.

By the method that has been described so far, the kurtosis can also be controlled.

2.4 Other modifications (1) In the above embodiment, the KRS is controlled every predetermined number of times, and the kurtosis is controlled each time.

However, in the case where the control of the KRS is executed by dividing the frequencies into the frequency bands, the KRS can also be controlled each time. In this case, the standard deviation is adjusted each time by controlling the KRS, and the standard deviation is also adjusted each time by controlling the kurtosis. Since the control of the KRS and the control of the kurtosis are executed simultaneously, there is a possibility that the control is not converged.

Figure 19:
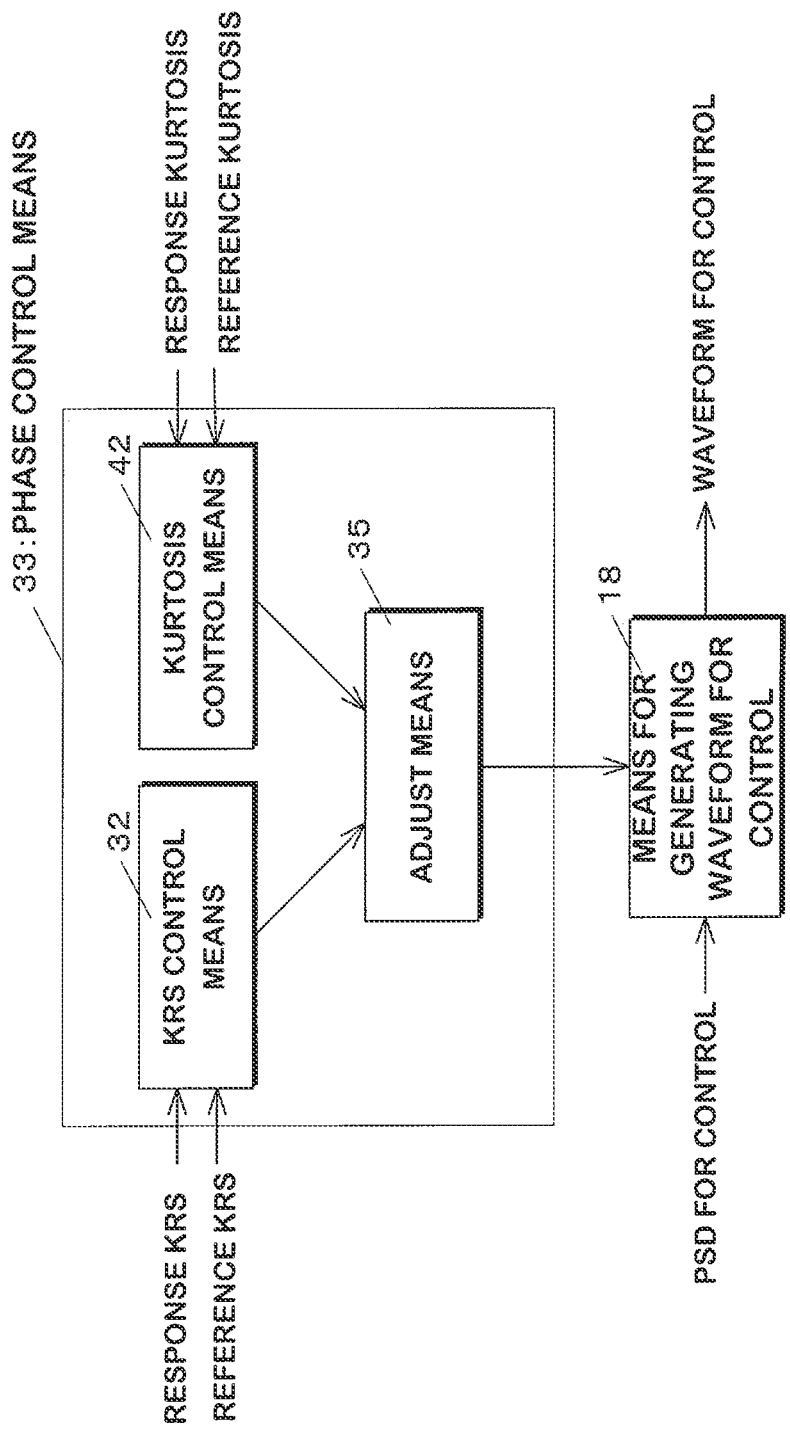
FIG. 19 is a diagram illustrating a configuration of phase control means 33 in another example.
Figure 20:
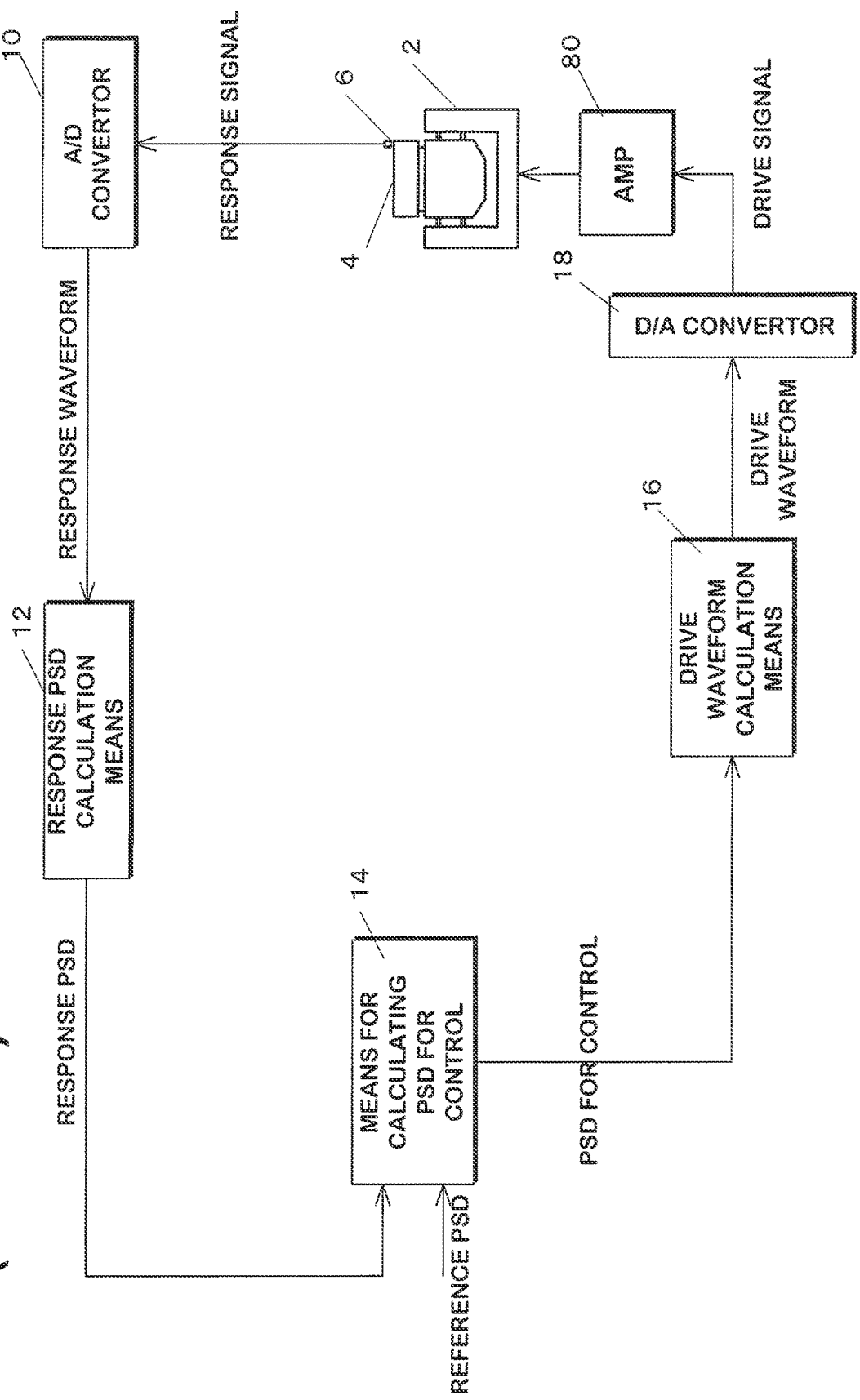
FIG. 20 is a diagram illustrating a general functional configuration of a vibration control system.

Accordingly, as illustrated in FIG. 19, adjustment means 35 may be provided to adjust the control of the standard deviation by the KRS control means 32 and the control of the standard deviation by the kurtosis control means 42.

For example, after the control by the kurtosis control means 42 is executed a predetermined number of times, the control by the KRS control means 32 may be executed. After providing the phase, which is obtained by the kurtosis control means 42, to the means 18 for generating a waveform for control the predetermined number of times, the adjustment means 35 provides the phase obtained by the KRS control means 32 to the means 18 for generating a waveform for control. Since the control by the KRS control method 32 requires a long processing time, it is preferred to reduce the number of times of the control by the KRS control means 32.

Alternatively, it may be determined per frequency band which control is executed as follows.

Figure 18C:
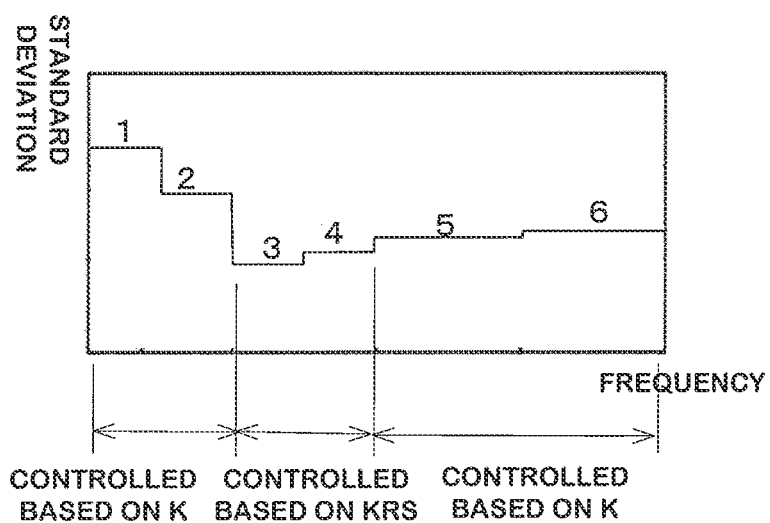

The adjustment means 35 makes such adjustment that the phase obtained by the KRS control means 32 is used for the frequency band in which the response KRS significantly deviates from the reference KRS (or may be the frequency band with the large reference KRS) and that the phase obtained by the kurtosis control means 42 is used for the rest of the frequency bands. For example, as illustrated in FIG. 18C, the frequency band is divided into first to sixth frequency bands. Then, the control can be executed on the basis of the KRS for the third and fourth frequency bands, and the control can be executed on the basis of K for the other first, second, fifth, and sixth frequency bands.

In order to select the frequency band with the significant deviation (or the frequency band with the large reference KRS), a method for selecting the predetermined number of the frequency bands from the frequency band with the most significant deviation (the larger KRS), a method for selecting the frequencies, the deviation of each of which is equal to or larger than a predetermined value (the KRS is equal to or larger than a predetermined value), or the like can be adopted.

In addition, the frequency band with the significant deviation (the frequency band with the large reference KRS) may be changed in real time, or the frequency band with the significant deviation that is calculated in an initial state may be used as is in a fixed manner.

Furthermore, in the initial state of the control, instead of the control by the kurtosis control means 42, the control by the KRS control means 32 may be executed to determine the frequency band with the significant deviation.

When such a method is adopted, in the initial state of the control, the response KRS and the reference KRS may be shown on the display, the user may determine the frequency band with the significant deviation (the frequency band with the large reference KRS), and this frequency band may be set for the adjustment means 35.

(2) The above embodiment and the modifications thereof can be implemented in combination with another embodiment or a modifications thereof as long as not contradicting the essentiality thereof.

A general description of the present invention as well as preferred embodiments of the invention has been set forth above. It is to be expressly understood, however, the terms described above are for purpose of illustration only and are not intended as definitions of the limits of the invention. Those skilled in the art to which the present invention pertains will recognize and be able to practice other variations in the system, device, and methods described which fall within the teachings of this invention. Accordingly, all such modifications are deemed to be within the scope of the invention.

What is claimed is:

1. A vibration control system comprising:
   response Power Spectral Density (PSD) calculation means that executes a Fourier transform on a response waveform from a vibration sensor to calculate response PSD, the vibration sensor measuring vibration of a test piece vibrated by a vibration generator operating on the basis of a drive waveform;
   means for calculating PSD for control that compares the response PSD and reference PSD and calculates PSD for control such that the response PSD becomes equal to the reference PSD;
   drive waveform calculation means that executes an inverse Fourier transform by applying a phase to each frequency component on the basis of the PSD for control and outputs the drive waveform;
   response KRS calculation means that calculates a kurtosis response spectrum (KRS) for the response waveform and sets the KRS as a response KRS, the KRS indicating transferability of kurtosis at each frequency; and
   phase control means having KRS control means that compares the response KRS and a reference KRS and controls a characteristic of the phase provided to the drive waveform calculation means for each of the frequencies such that the response KRS becomes equal to the reference KRS.

2. The system according to claim 1, wherein the phase control means further having kurtosis control means comparing a response kurtosis of the response waveform and reference kurtosis and controlling a characteristic of the phase provided to the drive waveform calculation means such that the response kurtosis becomes equal to the reference kurtosis.

3. The system according to claim 2, wherein
   the phase control means selects, for each frequency band, whether to control the phase characteristic by the KRS control means or to control the phase characteristic by the kurtosis control means.

4. The system according to claim 3, wherein
   the phase control means controls the phase characteristic by the KRS control means in a frequency band in which deviation of the response KRS from the reference KRS is equal to or larger than a predetermined value.

5. The system according to claim 2, wherein
   based on a setting content, which is set in advance, the phase control means determines, in which frequency band, whether to control the phase characteristic by the KRS control means or to control the phase characteristic by the kurtosis control means.

6. The system according to claim 2, wherein
   the phase control means is configured to repeat control of the phase characteristic in each frequency band by the KRS control means for a first predetermined time and then control of the phase characteristic in a whole frequency range by the kurtosis control means for a second predetermined time.

7. The system according to claim 2, wherein
   the response KRS calculation means calculates the KRS for each of a plurality of frequency bands, and the KRS control means controls the characteristic of the phase for each of the frequency bands.

8. The system according to claim 2, wherein the KRS control means controls standard deviation of phase distribution for each of the frequency components or each of the frequency bands.

9. The system according to claim 1, wherein the KRS control means controls standard deviation of phase distribution for each of the frequency components or each of a plurality of frequency bands.

10. A vibration control method comprising:

executing a Fourier transform on a response waveform from a vibration sensor to calculate response Power Spectral Density (PSD), the vibration sensor measuring vibration of a test piece vibrated by a vibration generator operating on the basis of a drive waveform;

comparing the response PSD and reference PSD and calculating PSD for control such that the response PSD becomes equal to the reference PSD;

executing an inverse Fourier transform by applying a phase to each frequency component on the basis of the PSD for control and calculating the drive waveform;

calculating kurtosis of the response waveform as response kurtosis;

calculating a kurtosis response spectrum (KRS) for the response waveform and setting the KRS as a response KRS, the KRS indicating transferability of the kurtosis at each frequency; and comparing the response kurtosis and reference kurtosis and controlling a characteristic of the phase used for the calculation of the drive waveform such that the response kurtosis becomes equal to the reference kurtosis, and comparing the response KRS and a reference KRS and controlling the characteristic of the phase used for the calculation of the drive waveform for each of the frequencies such that the response KRS becomes equal to the reference KRS.

11. A vibration control system comprising:

a Central Processing Unit (CPU);

a memory;

an analog to digital and a digital to analog converter both in communication with the CPU;

the memory storing a program that when executed by the CPU:

executes a Fourier transform on a response waveform from a vibration sensor to calculate response power spectral density (PSD), the vibration sensor measuring vibration of a test piece vibrated by a vibration generator operating on the basis of a drive waveform;

compares the response PSD and reference PSD and calculates PSD for control such that the response PSD becomes equal to the reference PSD;

executes an inverse Fourier transform by applying a phase to each frequency component on the basis of the PSD for control and outputs the drive waveform;

calculates a kurtosis response spectrum (KRS) for the response waveform and sets the KRS as a response KRS, the KRS indicating transferability of kurtosis at each frequency; and compares the response KRS and a reference KRS and controls a characteristic of the phase for each of the frequencies such that the response KRS becomes equal to the reference KRS.

12. The system according to claim 11, further comprising the program comparing a response kurtosis of the response waveform and reference kurtosis and controlling a characteristic of the phase such that the response kurtosis becomes equal to the reference kurtosis.

* * * * *